US012513190B2

(12) United States Patent
Meisel et al.

(10) Patent No.: US 12,513,190 B2
(45) Date of Patent: Dec. 30, 2025

(54) SNAPSHOT FOR ACTIVITY DETECTION AND THREAT ANALYSIS

(71) Applicant: MICROSOFT TECHNOLOGY LICENSING, LLC, Redmond, WA (US)

(72) Inventors: Eitam Meisel, Ra'anana (IL); Meir Baruch Blachman, Jerusalem (IL); Tomer Cherni, Gany Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 18/421,609

(22) Filed: Jan. 24, 2024

(65) Prior Publication Data

US 2025/0240323 A1    Jul. 24, 2025

(51) Int. Cl.
*H04L 9/40* (2022.01)
(52) U.S. Cl.
CPC .............. *H04L 63/1483* (2013.01)
(58) Field of Classification Search
CPC .................................................. H04L 63/1483
USPC ....................................................... 726/23
See application file for complete search history.

(56) References Cited

U.S. PATENT DOCUMENTS

| 8,589,810 B2 * | 11/2013 | Huslak ................. G06F 16/954 715/760 |
| 9,348,876 B1 * | 5/2016 | Paranjpe ............... G06F 16/248 |
| 11,803,460 B1 * | 10/2023 | Carpenter .............. G06F 9/542 |
| 11,979,383 B1 * | 5/2024 | Litty .................... H04L 63/0281 |
| 2018/0091546 A1 * | 3/2018 | Davidson ............. H04L 67/535 |

(Continued)

FOREIGN PATENT DOCUMENTS

| CA | 3108941 A1 * | 8/2021 |
| CN | 101375285 A | 9/2011 |
| CN | 112612690 A | 4/2021 |

OTHER PUBLICATIONS

Patel et al., "Screen Fingerprints: A Novel Modality for Active Authentication," in IT Professional, vol. 15, No. 4, pp. 38-42, Jul.-Aug. 2013, doi: 10.1109/MITP.2013.56. (Year: 2013).*

(Continued)

*Primary Examiner* — Peter C Shaw
(74) *Attorney, Agent, or Firm* — Shook, Hardy & Bacon L.L.P.

(57) ABSTRACT

Embodiments of the technology described herein identify and mitigate phishing attempts by analyzing user input using a client-side proxy component and a proxy server. Embodiments disclosed herein provide systems, methods, and computer-storage media for employing proxy server capabilities in conjunction with a snapshot capturing an image or video recording of a target action input by a user into a software application. Certain embodiments disclosed herein employ proxy server capabilities to capture a snapshot and/or screen recording based on a user authorization or approval. For example, the proxy server proactively captures the snapshot or screen recording prior to, during, and after the user performing a target action. From the snapshot, certain embodiments extract snapshot features or determine enriched-contextual event data that is used to perform a mitigation action, generate a security mitigation score, or update an administrator portal activity log for an authorized administrator.

19 Claims, 25 Drawing Sheets

(56) References Cited

U.S. PATENT DOCUMENTS

| | | | |
|---|---|---|---|
| 2018/0109634 A1 | 4/2018 | Lawson | |
| 2018/0145998 A1* | 5/2018 | Shaikh | H04L 63/1425 |
| 2021/0329022 A1* | 10/2021 | Chhetri | H04L 67/34 |
| 2021/0385085 A1* | 12/2021 | Wang | H04L 9/0833 |
| 2022/0138310 A1* | 5/2022 | McKinney | G06F 21/45 |
| | | | 726/6 |
| 2022/0270005 A1* | 8/2022 | Panigrahi | H04L 67/02 |
| 2023/0205834 A1 | 6/2023 | Youssef | |
| 2023/0394159 A1* | 12/2023 | Misra | G06F 21/577 |

OTHER PUBLICATIONS

Darwish et al., "Eye tracking analysis of browser security indicators," 2012 International Conference on Computer Systems and Industrial Informatics, Sharjah, United Arab Emirates, 2012, pp. 1-6, doi: 10.1109/ICCSII.2012.6454330. (Year: 2012).*

Abeywardena et al., "Triplet Mining-based Phishing Webpage Detection," 2020 IEEE 45th Conference on Local Computer Networks (LCN), Sydney, NSW, Australia, 2020, pp. 377-380, doi: 10.1109/LCN48667.2020.9314828. (Year: 2020).*

Sbaï et al., "Dataset Construction and Analysis of Screenshot Malware," 2020 IEEE 19th International Conference on Trust, Security and Privacy in Computing and Communications (TrustCom), Guangzhou, China, 2020, pp. 646-655, doi: 10.1109/TrustCom50675.2020.00091. (Year: 2020).*

AEPD, "Access To Applications On The Screen For Android Devices," Technological Assessment & Studies Unit, Jul. 12, 2023, 03 Pages.

Gray, et al., "Dark Patterns and the Legal Requirements of Consent Banners: An Interaction Criticism Perspective," In Proceedings of the CHI Conference on Human Factors in Computing Systems, May 8, 2021, 18 Pages.

Meng, et al., "Analyzing Use of High Privileges on Android: An Empirical Case Study of Screenshot and Screen Recording Applications," In Publication of Research Gate, Jan. 2019, 21 Pages.

* cited by examiner

SNAPSHOT FOR ACTIVITY DETECTION AND THREAT ANALYSIS

BACKGROUND

Schemes to fraudulently acquire user information have become more common on the Internet. One such scheme is referred to as "phishing." Certain phishing schemes are quite elaborate and continue to grow in their level of sophistication. In some schemes, a user is diverted from a legitimate user interface, such as a webpage, to an illegitimate user interface, such as a fraudulent webpage, that is plausibly similar in appearance to the legitimate user interface. In some instances, a user is led to this type of fraudulent webpage by clicking a link, by incorrectly typing a web address, by engaging with a graphical user interface (GUI) element, or by any other mechanism. Other schemes can be based on a user being convinced to download content from a fraudulent website based on incorrect information, such as an email purporting to be from a known business or service provider. In still other schemes, a user may correctly enter information to visit a desired website, but the user is re-routed due to a corrupted server. Prior to, during, or after a user engages with a potentially malicious feature, a computer often has little or no context or guidance with which to evaluate or gather intelligence regarding whether the user engagement with the potentially malicious element is legitimate. This makes advanced phishing schemes difficult or even impossible for certain existing technology to detect and thereafter deter a user from engaging with malicious content.

SUMMARY

This Summary is provided to introduce a selection of concepts in a simplified form, which are further described below in the Detailed Description. This Summary is not intended to identify key features or essential features of the claimed subject matter, nor is it intended to be used as an aid in determining the scope of the claimed subject matter.

Embodiments of the technology described herein identify and mitigate phishing attempts by analyzing user engagement as part of a target event within an application, such as a web browser application. Analysis of the user engagement is improved, for example, by capturing a snapshot of the user engagement, which provides additional context and visual information (in one example, referenced as "snapshot features") that enhance the server-side analysis (for example, via the distributed server system or the proxy server), build an administrator portal activity log for an authorized administrator, generate a security mitigation score, or perform any suitable mitigation action. In one example, the "security mitigation score" is indicative of a severity level of the input violating the aspect of the security policy.

Certain embodiments disclosed herein provide systems, methods, and computer-storage media for employing proxy server capabilities in conjunction with a snapshot capturing an image or video recording of a triggering action input by a user into a software application. Certain embodiments disclosed herein employ proxy server capabilities to capture a snapshot and/or screen recording based on a user authorization or approval. For example, the proxy server proactively captures the snapshot or screen recording prior to, during, and after the user performs a target action. From the snapshot, certain embodiments extract enriched-contextual event data that is used to perform a mitigation action, generate a security mitigation score, or update an administrator portal activity log for an authorized administrator.

Embodiments of this disclosure include determining user consent to allow snapshot capturing within a web browser application directing user inputs through a proxy server. Based on the user consent, certain embodiments access an indication of an input (1) from a user, (2) within the web browser application, (3) directed to the proxy server, and (4) corresponding to a target action. In some instances, the input is determined to violate an aspect of a security policy. Based on the input violating an aspect of the security policy and based on the user consent, certain embodiments request a snapshot and enriched-contextual event data. Based on the snapshot and the enriched-contextual event data, certain embodiments perform a security mitigation based on the snapshot and the enriched-contextual event data. Example security mitigations include determining a security mitigation score, performing a mitigation action, generating a security mitigation score, or generating an administrator portal activity log for an authorized administrator, to name a few.

Accordingly, by employing the embodiments disclosed herein, cybersecurity can be improved without forgoing benefits of employing a proxy server. In one embodiment, the snapshot provides additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, a distributed server system requests the snapshot when a preliminary threat assessment provides the "unknown classification," or based on a suspected violation or violation of a security policy. Thereafter, in one example, the snapshot is communicated to the distributed server system for extraction of enriched-contextual event data. In this manner, network bandwidth is conserved by not automatically communicating every snapshot. Locally, in some embodiments, a cache is employed to have the snapshot readily available to facilitate threat assessment. In one example, the snapshot is deleted after a period of time or after a corresponding threat assessment has been completed. In this manner, the cache can be cleared or storage space updated to allow for storage of other data, thereby reducing memory strains that would otherwise be caused by storing and not deleting the snapshots. These benefits can be achieved while leveraging the proxy server's functionality, including maintaining the user's anonymity, filtering content, performing caching operations to reduce bandwidth usage, providing access control functionality, and enhancing network security, among others.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
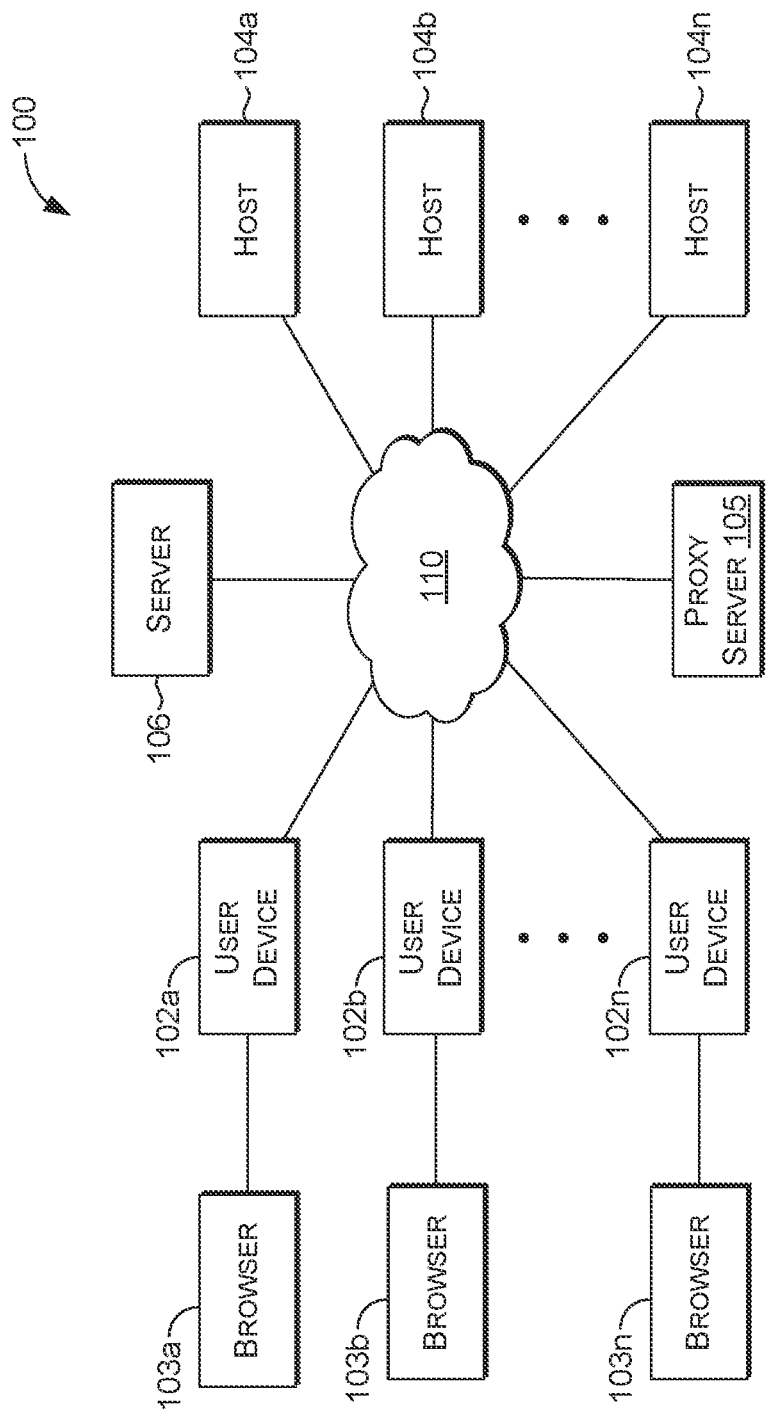
FIG. 1 is a block diagram of an example operating environment suitable for implementations of the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the technology described herein enhance and improve the identification and mitigation of phishing attacks by utilizing data derived from snapshots of a user's computing device. In particular, phishing attempts can be identified and mitigated by analyzing user input received at an application level, for example, within a web browser and captured via a snapshot. Analyzing the input at the application level, which may be analyzed as it is received by an injected client-side proxy component, allows for the simultaneous detection of threats and leveraging functionality of proxy servers, which is generally not possible via an analysis of input at an operating system (OS) level. Embodiments of the technology described herein perform a threat assessment when a target action is detected.

In some embodiments, a security policy is configured, customized, and registered with a threat detection system to reduce cybersecurity risks and better ensure availability of information systems within an enterprise or for a group of users. An example "security policy" outlines guidelines and rules to safeguard digital assets for an enterprise or a group of users. For example, the security policy includes measures for data, protection, user authentication, device security, network access controls, and incident response procedures. As part of the security policy, certain applications direct, through a proxy server, user navigations and user inputs intended for certain hosts or websites on the internet.

Typically, certain existing proxy servers interfere with client-side JavaScript code running in web browser applications in an attempt to catch actions, such as a file upload or download that happen entirely in the web browser application without hitting the server. As a result, these actions occurring on the web browser application occur entirely on the client side, without going through server-side policy evaluation. To try to address these issues, certain existing proxy servers function as suffix proxies that append a suffix to the requested Uniform Resource Locator (URL). Certain proxy servers modify JavaScript navigations and Asynchronous JavaScript and Extensible Markup Language (XML) (AJAX) actions by appending or removing a suffix from the URLs. In one example, this modification to the JavaScript code and AJAX syntax through suffix appending is referred to as "hooking." Suffix proxies performing hooking typically modify the JavaScript code received from the original application before the JavaScript code is sent to the client device. In doing so, certain suffix proxies parse the JavaScript code and insert "hooks" into places marked as relevant, such as places in the JavaScript code corresponding to certain functions or navigation events. Parsing, hooking, and rebuilding JavaScript files is generally a resource-intensive and time-intensive operation that is unable to render timely results given the time sensitivity of certain security-related issues. Moreover, this existing technique is unable to process larger JavaScript files. As enterprises seek to expand and scale adoption of proxy services, these existing techniques create network bottlenecks and high resource utilization that other existing solutions, such as caches, cache distribution, load balancing, and the like, fail to remedy or improve.

With this in mind, certain embodiments disclosed herein provide systems, methods, and computer-storage media for employing proxy server capabilities in conjunction with a snapshot capturing an image or video recording of a triggering action input by a user into a software application. Certain embodiments disclosed herein employ proxy server capabilities to capture a snapshot and/or screen recording based on a user authorization or approval. For example, the proxy server proactively captures the snapshot or screen recording prior to, during, and after the user performs a target action. From the snapshot, certain embodiments extract enriched-contextual event data that is used to perform a mitigation action, generate a security mitigation score, or update an administrator portal activity log for an authorized administrator.

As used herein in one example, the "snapshot" refers to a screenshot consisting of a portion of the user interface exposed to the user, such as the entire screen or less than the entire screen. As further described herein, in some embodiments, a snapshot comprises image information corresponding to a state of a user interface, such as a graphical user interface (GUI), which includes graphical information to a user. In particular, certain embodiments described herein are discussed in the context of a snapshot that is a video comprising a screen recording of graphical information presented on a screen for the user. Some embodiments of the snapshot are described as comprising a portion of the screenshot (for example, less than the entire screen); however, it should be understood that the captured snapshot can include a screenshot of the entire screen, a snapshot of certain windows or background content, or any suitable area that can be defined and customized based on user preferences. Additionally, the embodiments herein are not limited to capturing visual content as part of the snapshot. In particular, in some embodiments, a snapshot represents a state of the user's computer system at the time the snapshot is formed or during the duration of the snapshot. This state information can include various data regarding the operation of the computer system at or in proximity to the time the snapshot operation is carried out. For example, in one embodiment, "capturing a snapshot" includes capturing visual content that is dynamic (such as a video) or static (such as an image), as well as other types of content (such as sound, for example, made by a user or a hardware speaker of the computer). Accordingly, in one example, snapshot is used to refer to screen recording or capturing a screen recording.

As used herein and in one example, "enriched-contextual event data" refers to metadata associated with the snapshot and a target action. Example enriched-contextual event data includes information in addition to the raw snapshot and the target action. For example, the enriched-contextual event data includes a time during which the snapshot was captured, annotations (for example, a bounded box, text, or other added markings) on the snapshot, a classification of the target action, an event identification (ID) corresponding to the target action, an ID of the user who submitted the input associated with the target action, and other present context associated with the snapshot and the target action. In one example, the enriched-contextual event data includes an expected context for the snapshot, and the expected context is compared against the present context of the snapshot to determine that the input violates the security policy, to generate the security mitigation score, or to perform a mitigation action, or to generate an administrator portal activity log for an authorized administrator.

In one example, "target action" refers to a type of user input that triggers snapshot capturing used to perform further evaluation against a security policy. Example target actions include a print action; a clipboard action comprising at least one of a copy action, a cut action, and a paste action; a credential action comprising a user inputting login or other credentials; or a file action comprising at least one of a download action or an upload action, among other actions that may result in a potential security risk and that can be intercepted by the proxy server. In one example, the target action corresponds to a user input that is performed within an application layer, such as within a browser application.

In one example, a "credential" refers to a type of secret or confidential information, such as Social Security numbers, credit card information, driver's license numbers, or passport IDs, that could be monitored by the system described herein. Embodiments of the technology described herein detect a credential entry as a user engagement with a login process, which may include instances where the user is entering credentials into an application or service, such as a webpage. The threat assessment is conducted to capture a snapshot of the user engagement with the login process and determine a security threat based on a present network content feature or a snapshot feature that is communicated to or determined by a distributed server system. A component running within the web browser application and soliciting credentials is one example of an attack that could be detected by analyzing input according to the technology described herein. In one embodiment, a snapshot is captured in response to a user inputting credentials. Additionally, certain snapshots of the phishing application soliciting credentials provides visual information that is consumable by the distributed server system to improve the identification and mitigation of phishing attempts.

Certain embodiments disclosed herein provide a proxy server that injects a client-side proxy component, such as a JavaScript client-side proxy component, into a client-side component, such as an application (for example, web browser application) running on a user device. The client-side proxy component can be used to identify characteristics of the application context and the network context. Embodiments of the technology described herein may employ a client-side proxy component using multiple context sensors: generic sensors, custom sensors, and enlightened sensors. Generic sensors provide basic network and process metadata for surfacing context about the identified threat. Custom sensors include application-specific sensors used for first-party applications, browsers, messaging, and other applications where target actions can occur or be derived from telemetry. Although some embodiments are discussed in the context of a network context, it should be understood that some embodiments are more generally applicable based on any other context. In one embodiment, a mismatch corresponds to a mismatch between a present context and an expected context. For example, if the user is downloading a file associated with URL host maliciouswebsite.com, this would be a mismatch between a present context and an expected context because the user would not be expected to download a document or file from URL host maliciouswebsite.com.

In one example, a "host" refers to a computer or other device connected to a computer network and capable of hosting or accessing any suitable content. In one embodiment, a host is a node that participates in user applications, either as a server, client, or both. An example host operates as a server offering information resources, such as websites, documents, and other online destinations for navigation; services, such as e-commerce, email, chat, blogging, and streaming; and applications, such as productivity applications, web-based applications, browsers, and the like, to other users or other hosts on the network. In this example, the host operating as a server accepts connections from users or workflows requesting a service function. The host may be identified via at least one assigned network address, such as an internet protocol (IP) address.

Embodiments of client-side proxy components leverage an application programming interface (API), such as a screen capture API, to directly provide context to the proxy server or the distributed server system. An example API includes the screen capture API provided by MOZILLA®. These applications may be specifically programmed to interact with the technology described herein. In some embodiments, code within the operating system (OS) layer or the application layer use the API, such as a public API.

After the client-side proxy component is initiated, for example, within the application running on the user device, the client-side proxy component or the proxy server prompts the user for permission to capture a snapshot. Based on the user granting permission to capture the snapshot, embodiments of the client-side proxy component capture a snapshot and store the snapshot, for example, as segments of a target duration, such as 5, 10, 15, 20, or 30 seconds, or any other duration. Based on the user not granting permission, certain embodiments disclosed herein are disabled. For example, based on the user not granting permission, the client-side proxy component or the proxy server ends the user session or restricts user access to certain computer functionality or websites.

Continuing with this example, assuming the user approves the request to allow snapshot capture, the client-side proxy component monitors user activity for occurrence of a target action, such as a credential input, a print action, a clipboard action, or a file action, among other actions. Upon detection of the target action being performed within the application on the user device, embodiments of the client-side proxy component send activity details to the proxy server. For example, activity details may include that the user is performing a file action, such as a file download, within the URL for www.outlook.com. In this example, the activity details include a first indication that the user is performing the file download, a second indication that the action is being performed within www.outlook.com, a third indication of an event identification (ID), and a fourth indication of the user ID.

Embodiments of the proxy server receive the event ID, the snapshot associated with the event ID, and the user ID. Based on these activity details, the proxy server performs a preliminary threat analysis, as described herein. Based on the preliminary threat analysis, the proxy server determines that the target action may violate the security policy. In order to perform a more thorough threat analysis, embodiments of the proxy server generate an event record including the event ID, the snapshot associated with the request, and the user ID. In some embodiments, the proxy server publishes the data in the event record to a message queue for processing by a distributed server system. In one example, the distributed server system refers to any server-side components. In one example, the distributed server system includes the proxy server. In another example, the distributed server system does not include the proxy server.

In some embodiments, the distributed server system or the proxy server performs a threat assessment. Embodiments of the technology described herein perform a threat assessment (after the preliminary threat assessment) when the target action is detected or upon generation of the event record comprising the event data. The threat assessment may use the event data to determine an application context and/or the network context that can be used as inputs to the assessment. Other information may also be used in the threat assessment process.

Among other possible classifications, the threat assessment may classify the target action as a valid/invalid location, safe/unsafe application, invalid certificate, password reuse, untrusted, known malicious, and/or unknown.

As used herein and in one example, a "valid location" classification is assigned when a target action matches the appropriate identity providers and authentication servers used by an organization associated with the target action. For example, microsoft.com is associated with MICROSOFT®. When a file is downloaded from the user's MICROSOFT® account, then the target action of downloading the file may be classified as a valid location. If the network context shows a URL, or other characteristic that is not associated with the organization, then the location may be classified as invalid. An invalid classification may trigger a mitigation action, such as blocking communication of the credential to the URL or suspension of the credential.

As used herein and in one example, a "safe/unsafe host" is a classification assigned to the URL or host receiving the target action. The classification indicates whether the URL or host is safe or unsafe for receiving the target action. The URL or host in question may be the active URL or host against which the target action is performed. Some URLs or hosts are classified as unsafe for all target actions because they are known to be used in phishing attacks or are otherwise classified as unsecure or unsafe.

As used herein and in one example, an "invalid certificate classification" occurs when a URL or host that is not known to be bad has an invalid certificate, which may indicate a potential man-in-the-middle attack. The certificate may be part of the network context.

As used herein and in one example, a "known malicious classification" is assigned when a target action is performed on a known malicious host (as indicated by a URL of a host that tracks known phishing hosts and/or hosts that pose a security risk).

As used herein and in one example, an "unknown classification" is assigned when a target action does not fit into any of the available classifications. The unknown classification may also be used when two or more of the classifications apply, for example, if there are two network connections and the assessment of one results in untrusted while the other results in trusted. The unknown classification could also be assigned when the URL appears to correspond to a new phishing host that is yet to be tracked by any list of known phishing hosts (or, conversely, safe/secure sites). In one example, the unknown classification is neither negative nor positive regarding whether a phishing attempt was determined. In this example, the unknown classification provides no definite conclusion regarding the threat assessment.

For certain classifications (such as unknown classifications), embodiments of the distributed server system access the event record, including the event ID, the snapshot associated with the request, and the user ID, to extract enriched-contextual event data. Embodiments of the distributed server system update the event record to include the enriched-contextual event data to further help address the potential threat. For example, the distributed server system adds one or more new entries, including the determined enriched-contextual event data, to the event record to generate an updated event record.

Certain embodiments of the distributed server system implement an image or video analysis algorithm to determine a security mitigation score for the snapshot. Example analysis algorithms include optical character recognition (OCR) that extract text-specific information from the snapshot. For example, performing optical character recognition (OCR) analysis on the snapshot includes extracting one or more text features from the snapshot based on the OCR analysis, and, based on the one or more text features and based on the enriched-contextual event data, determining the security mitigation score indicative of a severity level of the input violating the aspect of the security policy. However, the embodiments disclosed herein are not limited to implementing OCR, as any suitable algorithm can be implemented to determine the security mitigation score. For example, a machine learning model is implemented to determine the security mitigation score or perform a mitigation action based on one or more snapshot features. Example machine learning models include a neural network model, a logistic regression model, a support vector machine model, and the like.

By way of non-limiting example, suppose that the proxy server receives (1) an event ID indicating that an upload operation was attempted, (2) a snapshot including a screen recording of the 10 seconds during which the user was performing this target action, (3) the user ID indicating that this target action was attempted by the user associated with the email address user@companyname.net. In this example, the proxy server generates an event record including this information and communicates the event record to the distributed server system. The information in the event record can be published to a message queue accessible to the distributed server system and organized based on a first-in first-out (FIFO) scheme. Continuing this example, the distributed server system accesses the snapshot from the event record and extracts enriched-contextual event data. In this example, the enriched-contextual event data includes a time during which the snapshot was captured, an annotation (for example, a bounded box, text, or other added markings) on the region within the snapshot at which the user was selecting the upload command and the URL associated with the upload command, a classification indicating that the upload command corresponds to a file action, among other enriched-contextual event data. In this example, the distributed server system adds this enriched-contextual event data to the event record to generate an updated event record. In one embodiment, the updated event record is used for threat assessment.

By way of non-limiting example of a target action including credentials being input into a text field, the registered credentials are associated with the user in a credential data store, which is described in one example as a credential manager, and is associated with the security policy. In one embodiment, a hash of the credential is stored rather than the credential. In one embodiment, a hash of the credential is generated using a first function and stored for comparison with a hash generated from a user input. Embodiments of the technology described herein will perform a threat assessment when a credential entry is detected, without the credential or credential hash leaving the proxy server or the client-side proxy component of the user device.

Continuing this example, the technology described herein intercepts a user input via the client-side proxy component or the proxy server, generates a hash of the input, and compares it with a hash of a credential being monitored. In one embodiment, a hash of the last n characters received is generated where n is the character length of the credential. For example, a hash of the last eight characters entered is generated and compared to a hash of an eight-character password. In another embodiment, hashes of less than the full credential are generated and used to detect potential entry of a credential before the entry is complete. For example, a hash of four characters, five characters, six characters, and seven characters is generated in order to anticipate the entry of an eight-character password. In this example, the input strings are hashed at the character lengths that match hashes of partial credentials stored in the credential manager.

Continuing this example, a credential entry is detected when a hash for the character string entered matches a hash for a credential being monitored. In one embodiment, a potential credential entry is detected when a hash of the character string entered matches a hash for a partial credential. In one embodiment, a snapshot is captured in response to a credential entry being detected when the hash of the character string entered matches a hash for the potential credential. In one embodiment, a credential entry is detected in response to a copy-and-paste operation being performed in association with a credential entry text field. For example, a credential entry is detected based on copied text being pasted into the credential entry text field.

Embodiments of the technology described herein access, via the distributed server system, a snapshot phishing machine learning model trained on a plurality of snapshot features from a plurality of snapshots. Example snapshot features include machine learning features corresponding to the event ID, the user ID, aspects of the snapshot, and enriched-contextual event data. In one embodiment, the distributed server system requests the snapshot based on the threat assessment resulting in a particular classification, such as an unknown classification. In one embodiment, the distributed server system extracts snapshot features from the snapshot. Based on the extracted snapshot features, the distributed server system attempts to reclassify the threat, perform a mitigation action, generate a security mitigation score, or update an administrator portal activity log for an authorized administrator. In one example, a distributed server system performs this by comparing a snapshot feature of the snapshot to an existing and similar snapshot feature and assigning a similar classification as the snapshot from which the existing snapshot feature was taken.

Based on at least one of: (1) a snapshot feature extracted from the snapshot; (2) the present network content feature; (3) the enriched-contextual event data; and (4) a classification provided by a snapshot phishing classification logic implemented by a snapshot phishing machine learning model, the distributed server system determines a security mitigation. Additionally, a user may permit the captured snapshot, the present network content feature, the determined security threat, or the security mitigation to be shared with the distributed server system to train a machine learning model associated with the snapshot phishing classification logic, such as the snapshot phishing machine learning model. In one embodiment, the machine learning model is trained on labeled user data, such as captured snapshots that were labeled based on whether or not the image was associated with a phishing threat. For example, a captured snapshot determined to correspond to a phishing threat is positively labeled (or negatively labeled), such that the positive label (or negative label) and the corresponding snapshot are used to train the snapshot phishing machine learning model. As another example, a captured snapshot determined to not correspond to a phishing threat (and therefore is benign) is negatively labeled (or positively labeled), such that the negative label (or positive label) and the corresponding snapshot are used to train the snapshot phishing machine learning model.

Various security mitigations are taken when a threat is detected or when the security mitigation score is determined, for example, based on the snapshot and the enriched-contextual event data. A user and/or system administrator may specify the mitigation action taken when a threat is detected. Different mitigation actions are specified for different threat classifications or different security mitigation scores. One type of mitigation is threat reporting. Useful sensor data and telemetry, as well as snapshots, may be sent to a cloud protection service associated with the operating system vendor, or to a system administrator associated with an organization (for example, employer) managing the computing device. The same information may be made accessible to a user of the device being monitored. Phishing determinations may also be shared (considering all compliance and privacy guidelines) with a centralized threat-protection service of the distributed server system that would benefit from leveraging the phishing data to better protect customers from phishing. For example, the threat-protection service employs the snapshot phishing machine learning model to improve detection and mitigation of phishing attacks.

In some embodiments, the security mitigations can also include user awareness efforts. From the perspective of certain users, the phishing protections have generic (not application-specific) user interfaces that allow for screen recording, blocking phishing attempts, changing passwords, warning about detected risks, phishing education, and social engineering training. These last two options may appeal to certain enterprises that would like to deliver targeted additional security training to end-users.

Overview of Technical Problems, Technical Solutions, and Technological Improvements Certain existing proxy servers interfere with client-side JavaScript code running in browser applications in an attempt to catch actions, such as file uploads or downloads that happen entirely in the web browser application. Using certain existing technology, these web browser actions occur on the client side without hitting the server or undergoing a security policy evaluation. Certain proxy servers modify JavaScript navigations and AJAX actions by appending or removing a suffix from the URLs. Suffix proxies performing hooking typically modify the JavaScript code received from the original application before the JavaScript code is sent to the client device. In doing so, certain suffix proxies parse the JavaScript code and insert hooks into places marked as relevant, such as places in the JavaScript code corresponding to certain functions or navigation events. Parsing, hooking, and rebuilding JavaScript files is generally a resource-intensive and time-intensive operation that is unable to render timely results given the time sensitivity of certain security-related issues. Moreover, this existing technique is unable to process larger JavaScript files. As enterprises seek to expand and scale adoption of proxy services, these existing techniques create network bottlenecks and high resource utilization that other existing solutions, such as caches, cache distribution, load balancing, and the like fail to remedy or improve.

To address these and other issues, embodiments of the technology described herein enhance and improve the identification and mitigation of phishing attacks by utilizing snapshots of a user's screen and data derived from snapshots. By leveraging data across different devices and users, a snapshot phishing machine learning model can be improved through crowd-sourced and de-identified data to improve the accuracy of identifying a security threat based at least on snapshots. Additionally, by employing the embodiments disclosed herein, the snapshot provides additional details relevant to the classification of the threat, thereby reducing previous threat assessments resulting in an unknown classification. Moreover, to reduce latency, preserve computation resources, and avoid overloading a network bandwidth, embodiments of the technology described herein request the captured snapshot in certain instances. For example, the distributed server system requests the snapshot when the threat assessment provides the "unknown classification," or based on a suspected violation or violation of a security policy. Thereafter, in one example, the snapshot is communicated to the distributed server system for extraction of enriched-contextual event data. In this manner, network bandwidth is conserved by not automatically communicating every snapshot. Locally, in some embodiments, a cache is employed to have the snapshot readily available to facilitate threat assessment. In one example, the snapshot is deleted after a period of time or after a corresponding threat assessment has been completed. In this manner, the cache can be cleared or storage space updated to allow for storage of other data, thereby reducing memory strains that would otherwise be caused by storing and not deleting the snapshots. These benefits can be achieved while leveraging the proxy server's functionality, including maintaining the user's anonymity, filtering content, performing caching operations to reduce bandwidth usage, providing access control functionality, and enhancing network security, among others.

Additional Description of the Embodiments

Having briefly described an overview of embodiments of the technology described herein, an exemplary operating environment in which embodiments of the technology described herein may be implemented is described below in order to provide a general context for various embodiments.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as hosts 104*a* and 104*b* through 104*n*; proxy server 105; server 106; browsers 103*a* and 103*b* through 103*n*; and network 110. It should be understood that the operating environment 100 shown in FIG. 1 is an example of one suitable operating environment. Each of the components shown in FIG. 1 is implemented via any type of computing device, such as computing device 2000 illustrated in FIG. 20, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, browsers, search engines, servers, hosts, and data sources can be employed within operating environment 100 within the scope of the present disclosure. Each may comprise a single device or multiple devices cooperating in a distributed server system, such as the distributed computing environment 1900 in FIG. 19. For instance, server 106 is provided via multiple devices arranged in a distributed environment that collectively provides certain functionality described herein. Additionally, other components not shown may also be included within the distributed environment.

In one embodiment, the server 106 implements aspects of the example distributed server system 302. For example, the server 106 may run a threat detection system that receives information about threats analyzed or detected. In one embodiment, the threat detection system implements aspects of the snapshot phishing machine learning model. System administrators for an organization may use the server 106 to set monitoring and mitigation parameters for the threat detection system running on user devices associated with the organization. This division of operating environment 100 is provided to illustrate one example of a suitable environment, and there is no requirement for each implementation that any combination of server 106 and user devices 102*a* and 102*b* through 102*n* remain as separate entities.

In one example, the proxy server 105 is included in or separate from the server 106. In one embodiment, "proxy server" refers to a device acting as an intermediary between a user device 102 and the hosts 104 accessible via the internet. For example, when a user requests, via a browser 103 running on the user device 102, a resource from a host 104 on the internet, the request is sent to the proxy server 105 instead of a target data source associated with the host 104. If the user request satisfies the security policy, the proxy server 105 forwards the user request to the target data source associated with the host 104 and relays the response back to the user device 102. In this manner, the proxy server 105 can maintain the user's anonymity, filter content, perform caching operations to reduce bandwidth usage, provide access control functionality, and enhance network security.

In one embodiment, user devices 102*a* and 102*b* through 102*n* are client user devices on the client side of operating environment 100, while server 106 is on the server side of operating environment 100. Embodiments of server 106 comprise server-side software designed to work in conjunction with client-side software on user devices 102*a* and 102*b* through 102*n* so as to implement any combination of the features and functionalities discussed in the present disclosure. In one example, user device 102*a* receives user inputs via a browser 103*a* to allow access via network 110 to the server 106 or hosts 104*a* and 104*b* through 104*n*. For example, user inputs into a browser 103 causes a browser 103 to access any number of hosts 104, for example, via a search engine. In one example, user queries are submitted to a search engine, which generates search results responsive to those queries. It should be understood that the division of operating environment 100 is provided to illustrate one example of a suitable environment, and there is no requirement for each implementation that any combination of the illustrated components, such as server 106 and user devices 102*a* and 102*b* through 102*n*, remain as different or separate entities.

In some embodiments, user devices 102*a* and 102*b* through 102*n* comprise any type of computing device capable of use by a user. For example, in one embodiment, user devices 102*a* and 102*b* through 102*n* are the type of computing device 2000 described in relation to FIG. 20. In embodiments, the technology described herein may take the form of a security function running on a single user device. The security function may be part of the user device's operating system, application layer, or any component on the client side or the server side. Embodiments of the user devices 102*a* and 102*b* through 102*n* are protected by the threat detection technology described herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a Global Positioning System (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, hosts 104*a* and 104*b* through 104*n* includes a computer or other device connected to network 110 and is capable of hosting or accessing any suitable content from any number of data sources. In one embodiment, a host is a node that participates in user applications, either as a server, client, or both. An example host operates as a server offering information resources, such as websites, documents, and other online destinations for navigation; services, such as e-commerce, email, chat, blogging, and streaming; and applications, such as productivity applications, web-based applications, browsers, and the like, to other users or other hosts on the network. In one embodiment, one or more hosts 104*a* and 104*b* through 104*n* provide (or make available for accessing) an API response based on an API call. In one embodiment, one or more hosts 104*a* and 104*b* through 104*n* correspond to endpoints. The hosts 104*a* and 104*b* through 104*n* may be identified via corresponding assigned network addresses, such as IP addresses. Certain hosts 104*a* and 104*b* through 104*n* provide access to data from data sources that are discrete from user devices 102*a* and 102*b* through 102*n* and server 106 or are incorporated and/or integrated into at least one of those components. Examples of data made available by hosts 104*a* and 104*b* through 104*n* can include any suitable data discussed herein.

Figure 2A:
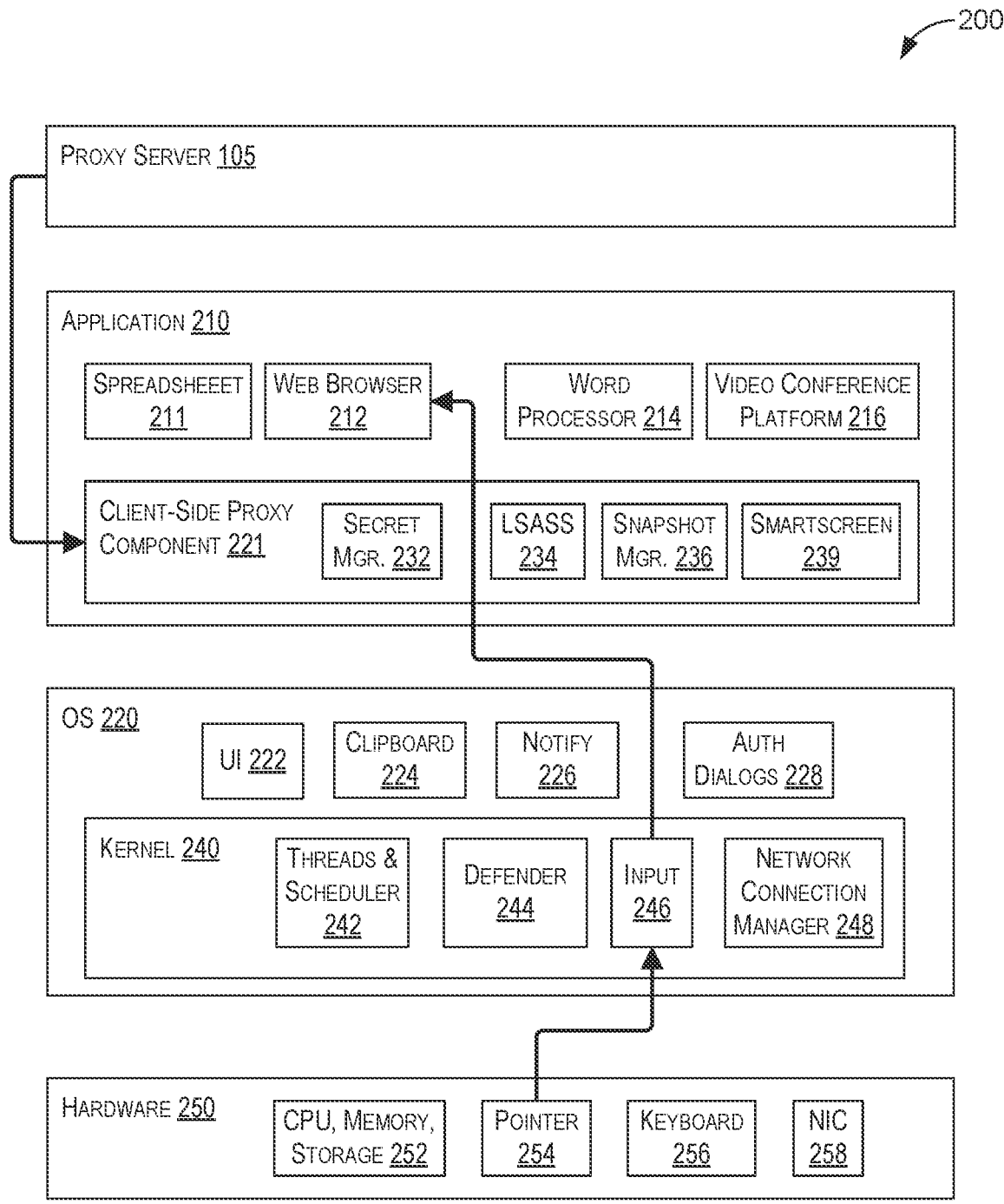
FIGS. 2A and 2B are diagrams depicting the capture of pointer and analysis of a selection made within an application, in accordance with an embodiment of the technology described herein.
Figure 2B:
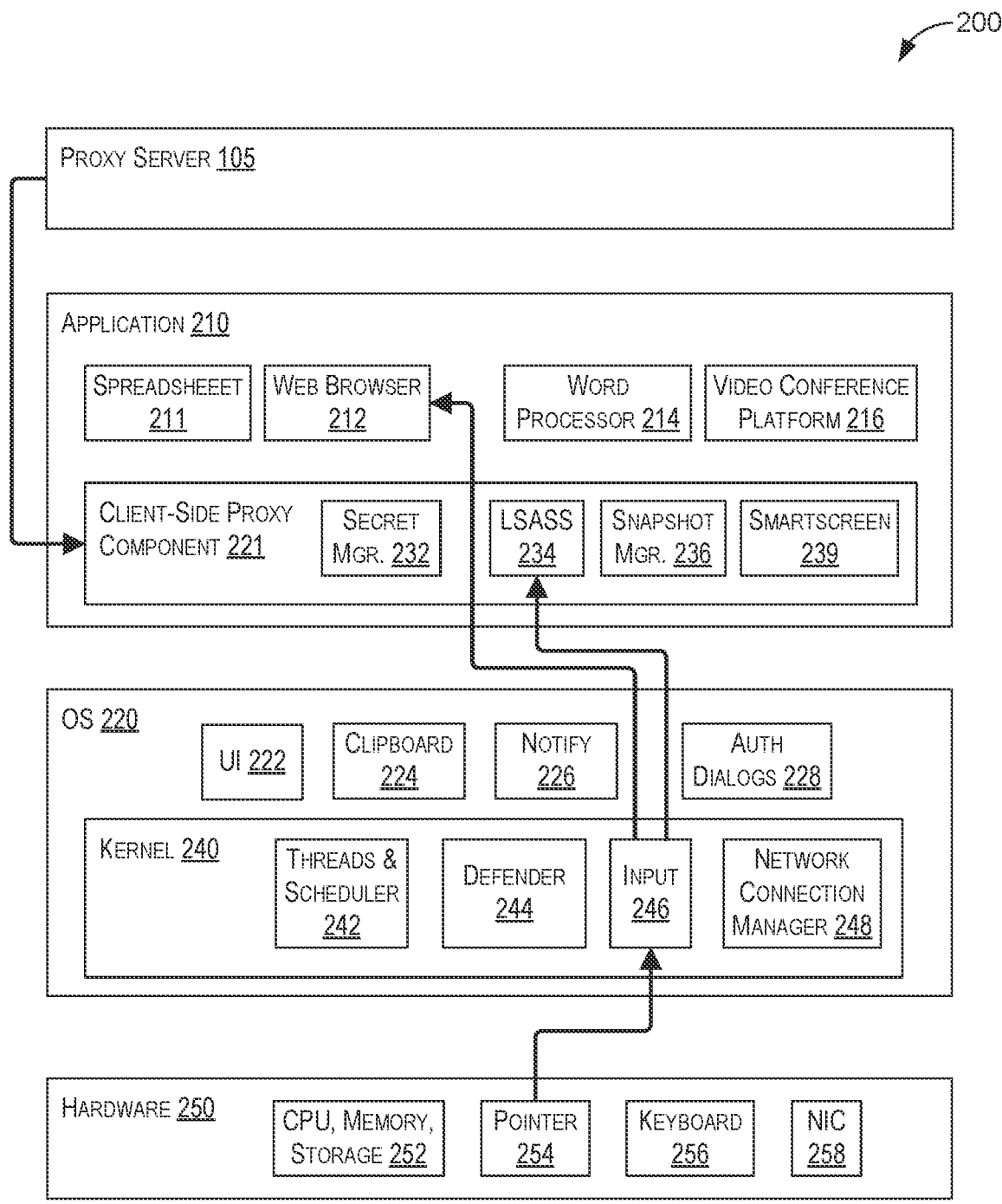
Figure 2C:
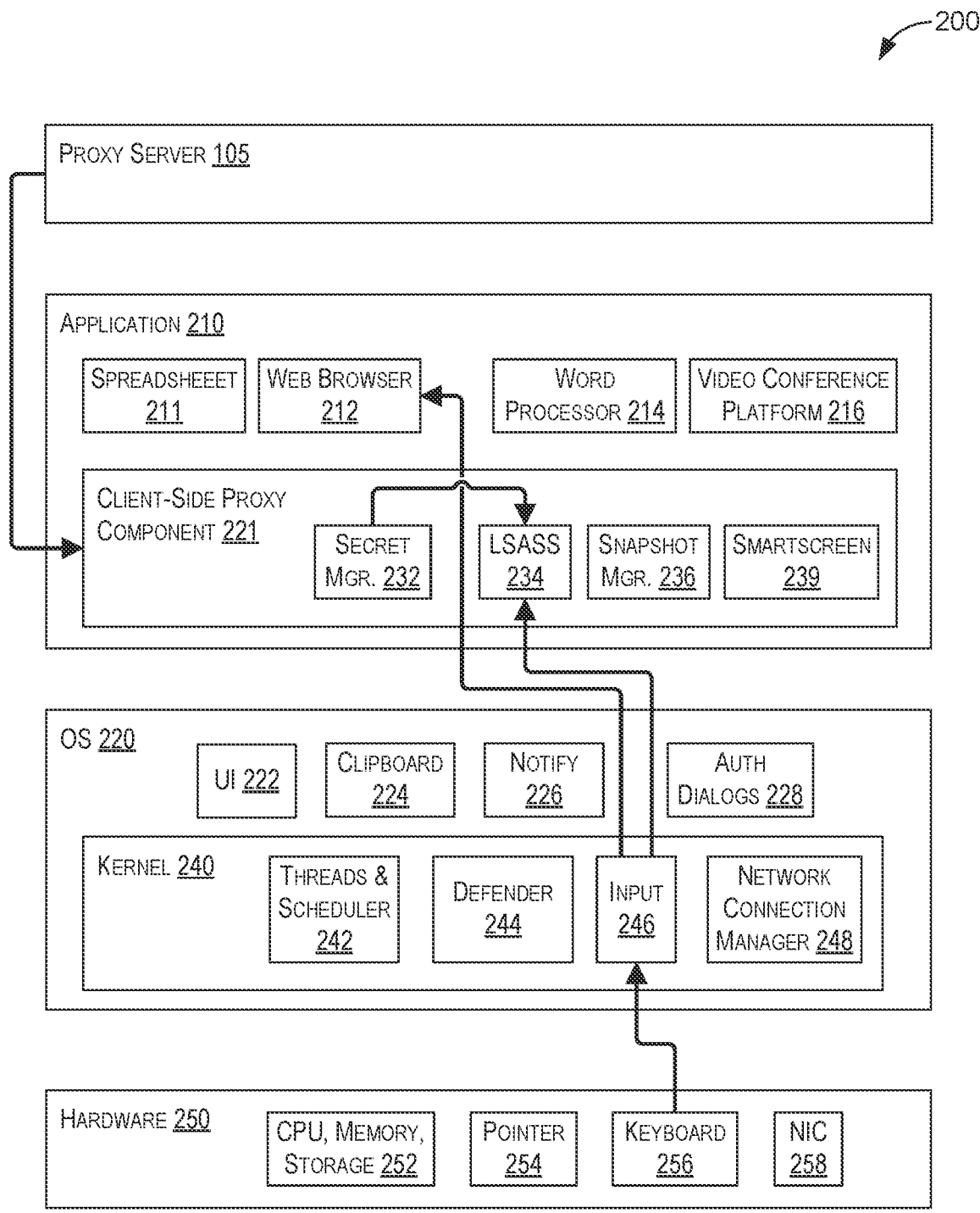
FIG. 2C is a diagram depicting the capture of keyboard and analysis of a strokes input with respect to an application, in accordance with an embodiment of the technology described herein.

Operating environment 100 may be utilized to implement one or more of the components of computing environment 200, described in FIGS. 2A, 2B, and 2C, including components for target action detection, context collection, threat assessment, mitigation, snapshot capture and management, and user awareness.

Figure 3:
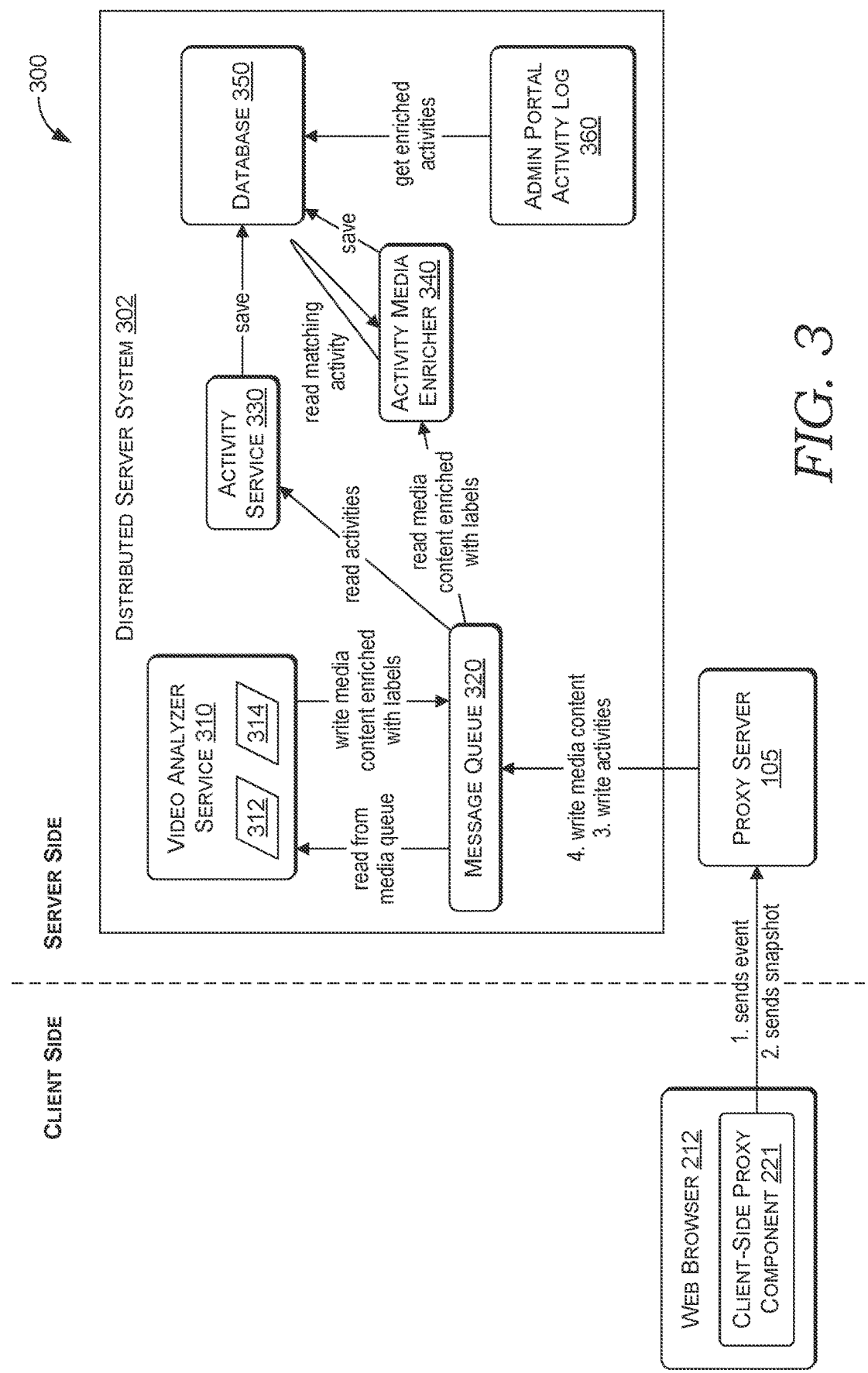
FIG. 3 is a block diagram depicting an architecture used to detect a phishing website, capture a snapshot, and build an administrator portal activity log, in accordance with an embodiment of the technology described herein.
Figure 4:
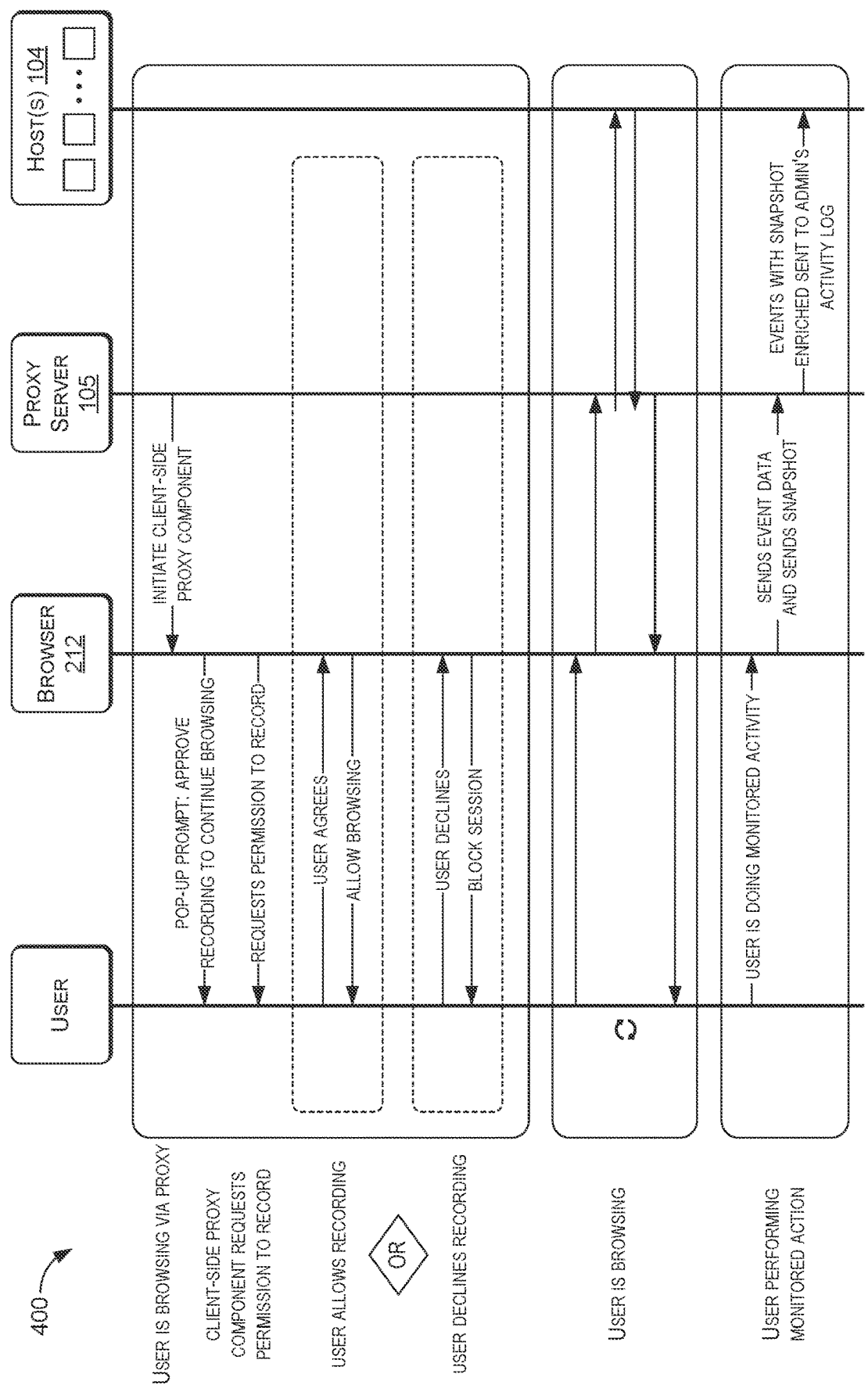
FIG. 4 is a sequence flow diagram depicting the interaction of components of the architecture of FIG. 3 to detect a phishing website, capture a snapshot, and build an administrator portal activity log, in accordance with an embodiment of the technology described herein.

Turning now to FIG. 2A, a computing environment 200 suitable for use with embodiments of the technology described herein is provided. FIGS. 2-4 are used herein to illustrate user inputs being entered and how they may be analyzed by the technology described herein. A brief description of the components is shown before the actions taken to analyze inputs for performance of a target action are described. Some components described in FIGS. 2A, 2B, and 2C are described using terms often used to describe components of the WINDOWS® operating system provided by MICROSOFT®. However, embodiments of the technology described herein are not limited to use with WINDOWS®. Embodiments of the features of the technology described herein may be added to other operating systems, as such as LINUX®, Android®, macOS®, iOS®, and the like, which can include many of the same components and perform similar functions.

The computing environment 200 comprises a hardware layer 250, operating system components 220, kernel components 240, and example applications. Together, with or without components not shown, the operating system components 220 may be described as an operating system. Some operating systems may combine a user mode and kernel mode or move operations around. In WINDOWS®, the processor switches between the two modes depending on what type of code is running on the processor. Applications run in user mode, and core operating system components run in kernel mode. While many drivers run in kernel mode, some drivers may run in user mode.

In some embodiments, when a user-mode application starts, the operating system creates a process for the application. In one embodiment, the process provides the application with a private virtual address space and a private handle table. Because an application's virtual address space is private, one application generally cannot alter data that belongs to another application. In addition to being private, in some embodiments, the virtual address space of a user-mode application is limited. For example, a processor running in user mode cannot access virtual addresses that are reserved for the operating system. In one embodiment, limiting the virtual address space of a user-mode application prevents the application from viewing, altering, and possibly damaging critical operating system data.

In some embodiments, all kernel components 240 share the same system address space (which is accessible only from kernel mode). For example, a kernel-mode driver is not isolated from other drivers or the operating system itself.

As illustrated, embodiments of the operating system components 220 comprise kernel components 240. Many components of the operating system, such as a hardware abstraction layer between the hardware and the kernel components 240, are not shown in FIG. 2A, which includes illustrative components and components used in threat detection and/or assessment. In one embodiment, the "kernel," of which the kernel components 240 are a part, is a computer program at the core of a computer's operating system and has control over the system. Embodiments of the kernel facilitate interactions between hardware and software components. For example, the kernel controls hardware resources (for example, input/output [I/O] or memory) via device drivers, arbitrates conflicts between processes concerning such resources, and optimizes the utilization of common resources (for example, central processing unit [CPU], memory, and storage 252). In some embodiments, the kernel is one of the first programs loaded on startup (after the bootloader). Once loaded, the kernel may handle the rest of startup, as well as memory, peripherals, and input/output (I/O) requests from software, translating them into data-processing instructions for the CPU.

The code of the kernel may be loaded into a separate area of memory, which is protected from access by application software or other, for example, less critical parts of the operating system. In one embodiment, the kernel performs tasks, such as running processes, managing hardware devices such as the hard disk, and handling interruptions in this protected kernel space. In contrast, application programs like spreadsheets 211, browsers 212, word processors 214, or video conference platforms 216 may use a separate area of memory, sometimes described as a user mode. This separation generally helps prevent user data and kernel data from interfering with each other and causing instability and slowness, as well as preventing malfunctioning applications from affecting other applications or crashing the entire operating system.

The illustrated kernel components 240 include a thread manager and scheduler 242, a threat defender 244, an input manager 246, and a network connection manager 248. In some embodiments, the operating system kernel may include additional components. In one example, the thread manager and scheduler 242 handles the execution of threads in a process. In one example, an instance of a program runs in a process. In some embodiments, each process has an ID, a number that identifies it. In one example, a thread is a schedulable entity within a process, or a stream of execution within a process.

In some embodiments, the threat defender 244 provides access control and reporting functionality. One function in the context of the technology described herein is to provide a reporting pipeline to enterprises on the security well-being of an enterprise device, such as an employee's laptop. As such, verdicts for each credential entry may be passed through the threat defender 244 to the enterprise such that information technology (IT) admins can be alerted to a potential phishing attack or unsafe credential entry. This reporting can be part of various mitigation actions, such as disabling a password. In some embodiments, the operating system components 220 or the proxy server 105 (FIG. 1) makes sure that the action is not a violation of security policy. For example, suppose a device is or is not accessible to all requests. Continuing this example, a driver allows some requests to succeed or fail, depending on the permission of the entity making the request. The threat defender 244 may use an access control list (ACL) to determine which objects have what security. The threat defender 244 may perform access checking before a handle can be opened to an object (such as a file, event, mutex, process, thread, and the like), and what operations may be performed on that object (create, read, write, delete, and the like).

In one example, the input manager 246 facilitates hardware input. Generally, a computer consists of various devices, such as the I/O components 2020 of FIG. 20, which provide input and output (I/O) to and from the outside world. Typical devices are keyboards, mice, audio controllers, video controllers, disk drives, networking ports, and so on. In one embodiment, device drivers provide the software connection between the devices and the operating system. In some embodiments, the input manager 246 manages the communication between applications and the interfaces provided by device drivers.

In one example, the network connection manager 248 manages communications between the NIC 258, components of the operating system 220, and applications 210. In one example, the network connection manager 248 provides network context information. The network manager may interact with one or more drivers to implement networking in the operating system.

In one example, the shell is the portion of the operating system that allows the user to communicate with the operating system, including the kernel. The operating system components 220 also comprise components that may be considered part of the OS shell, such as user interface component 222, clipboard 224, notification component 226, and authorization dialogs 228.

In one example, the user interface component 222 provides the operating system's main user interface, such as the desktop in WINDOWS®. In one example, the clipboard 224 is an interface feature that may capture objects (such as files, text, or images) in the operating system user interface and/or application interfaces and performs an operation on the captured object (such as a copy, cut, or move). For example, the clipboard 224 allows a user to copy text from a first application interface to a different interface or different location in the first application interface.

In one example, the notification component 226 manages notifications provided through the operating system 220. However, in some embodiments, the notification component 226 is included in the application layer 210 to manage notifications provided within the application. In some embodiments, the notifications originate with an application or service, such as an email application or social media service. Certain notifications allow the user to provide information and could be a potential phishing source, for example, through a compromised application. In one embodiment, the authorization dialog 228 allows the user to provide and/or confirm information that is used to authenticate the user to various entities and components.

In one embodiment, the client-side proxy component 221 includes a JavaScript client-side proxy component, running on application 210. In some embodiments, the client-side proxy component 221 is used to identify characteristics of the application context and the network context. As illustrated, the example client-side proxy component 221 includes a secret manager 232, the Local Security Authority Subsystem Service (LSASS) 234, snapshot manager 236, and SmartScreen component 239. In some embodiments, these components may be contained in other components of system 200, such as the operating system components 220. Operating system components are omitted from FIGS. 2A, 2B, and 2C for the sake of simplicity.

In one example, the secret manager 232 manages credentials. The secret manager 232 may use a credentials management API and credentials management user interface (UI) functions to obtain and manage credential information, such as usernames and passwords. These functions request that the account information (for example, MICROSOFT® account or GOOGLE® account) be used instead of the credentials established while logging on, such as a pin. Such requests typically occur when the logon credentials do not have permissions that are required by the application. In one embodiment, the secret manager 232 provides interfaces with the appearance of the operating system user interface. For example, these functions include customizable options that add users' information to the users' credentials store. Embodiments of the secret manager 232 receive credentials to be monitored for threat detection. In one embodiment, the credential management interface allows monitoring and mitigation preferences to be provided.

In one example, the LSASS 234 is responsible for enforcing the security policy on the system. For example, the LSASS 234 verifies users logging on to a computer or server, handles password changes, and creates access tokens. In one embodiment, the LSASS 234 provides stored credentials or secrets to other components described herein. For example, the LSASS 234 provides a credential for entry detection. Once entry is detected, a decision may be made whether the environment or context for the credential entry is secure.

For example, the LSASS 234 identifies a threat event, for example, for a target action based on a mismatch between a present network context and an expected network context. In one embodiment, the mismatch is based on a comparison of a present URL and an expected URL, a comparison of a present IP address and an expected IP address, a comparison of a present process ID and an expected process ID, a comparison of a present Server Name Indication (SNI) and an expected SNI, or a comparison of a present domain information and an expected domain information.

As illustrated, the snapshot manager 236 captures a snapshot based on the LSASS 234 identifying a threat event. In some embodiments, the snapshot manager 236 does not communicate the captured screenshot until a component requests the screenshot. Instead, in one example, the screenshot is locally cached on the device or a cloud server for a component to retrieve it upon request.

Thereafter, in one embodiment, the LSASS 234 performs a preliminary threat assessment and communicates the preliminary threat assessment to the proxy server 105 for downstream implementation of any security mitigation. In one example, the LSASS 234 asynchronously implements the security mitigations discussed herein, among others. In one embodiment, if the preliminary threat assessment has resulted in an "unknown" classification or if the proxy server 105 requests the enriched-contextual event data, then the proxy server 105 communicates the snapshot and event data discussed herein to a downstream distributed server system. In one embodiment, the downstream distributed server system generates an updated threat report, including the captured snapshot.

In some embodiments, the LSASS 234 deletes the snapshot after communicating it to the proxy server 105. In this manner, cache can be cleared or storage space updated to allow for storage of other data, thereby reducing memory strains that would otherwise be caused by storing and not deleting the snapshots.

In one example, the snapshot manager 236 is responsible for capturing snapshots associated with a potential phishing attack. In one embodiment, the snapshot manager 236 captures a snapshot when a user input corresponding to a target action is detected. In one example, the snapshot includes a smaller portion than the entire screenshot of the entire user interface presented to the user. In this manner, the snapshot may omit sensitive or confidential information displayed on a background that would otherwise be captured if the entire screenshot was used. For example, the snapshot manager 236 may format (for example, crop, cut, blur, or only capture a subset of the entire screen presented to a user to format) the snapshot. In one example, the snapshot manager may format the snapshot into any suitable image or video formats. In some embodiments, the entity requesting the snapshot (for example, the proxy server 105 or the distributed server system 302 of FIG. 3) specifies a desired format, and the snapshot manager 236 converts the snapshot to the desired format. In one embodiment, the proxy server 105 or the distributed server system 302 of FIG. 3 converts the snapshot into the desired format.

After the snapshot manager 236 captures the screenshot, the snapshot is locally stored, for example, in the storage 252. As a result, the snapshot can be captured and locally cached for a period of time so that the snapshot can be communicated to a distributed server system (such as server 106 of FIG. 1 and/or distributed server system 302 of FIG. 3) upon request by the proxy server 105 or the distributed server system 302. In this manner, network bandwidth is conserved by not automatically communicating every snapshot to the distributed server system 302. Instead, in some embodiments, the snapshot is communicated upon a request from the distributed server system 302 for the snapshot. For example, the distributed server system 302 requests the snapshot based on a mismatch between a present network context and an expected network context for an application being inconclusive, based on an unknown classification assigned to the mismatch, or based on a prior snapshot not having been previously communicated within a threshold time value.

In some embodiments, the snapshot manager 236 captures a snapshot. For example, the snapshot includes a screenshot of the application on which user inputs, corresponding to a target action, are being input. The snapshot manager 236 may omit, blur, or remove portions of the screen that may have sensitive information, such as personal identification information (PII) in violation of a security policy or privacy policy, such as any corporate, organizational, enterprise, state, or federal sensitivity policy. In this manner, the snapshot does not include privacy data that would otherwise violate a privacy policy by including a screenshot. Accordingly, embodiments of the snapshot manager 236 are configured with logic to detect and remove privacy information.

In one example, SmartScreen 239 determines whether a web site is potentially malicious by analyzing visited webpages looking for indications of suspicious behavior and by checking the visited sites against a dynamic list of reported and machine-identified phishing sites and malicious software sites. In one embodiment, the SmartScreen 239 is in communication with a cloud component that attempts to identify phishing sites and malicious software sites. For example, if SmartScreen finds a match, SmartScreen 239 shows a warning to let the user know that the site might be malicious.

In some embodiments, SmartScreen 239 determines whether a downloaded app or app installer is potentially malicious by checking downloaded files against a list of reported malicious software sites and programs known to be unsafe. SmartScreen 239 may be in communication with a cloud component that attempts to identify whether a downloaded app or app installer is potentially malicious. In one example, if a malicious verdict is given, SmartScreen 239 shows a warning to let the user know that the site or application might be malicious. Embodiments of SmartScreen 239 check downloaded files against a list of files that are well-known and downloaded by many Windows users. If the file is not on that list, SmartScreen 239 shows a warning, advising caution.

Among other components, the illustrated hardware layer comprises CPU, Memory, and storage 252; a pointer 254; a keyboard 256; and a network interface controller (NIC) 258. The CPU, memory, and storage may be similar to those described in FIG. 20. In some embodiments, the pointer 254 is a mouse, track ball, touch screen, touch pad, natural user input interface (for example, an interface that receives a body or voice gesture), or some other input device that controls a location of an interface pointer. In one example, the keyboard 256 is a physical keyboard or touchscreen keyboard.

In one example, the NIC 258 (also known as a network interface card, network adapter, local area network [LAN] adapter or physical network interface, and by similar terms) is a computer hardware component that connects a computer to a computer network. In some embodiments, the NIC 258 allows computers to communicate over a computer network, either wirelessly or by using cables. The NIC 258 may be both a physical layer and data link layer device, as it generally provides physical access to a networking medium, and, for IEEE 802.11 protocol and similar networks, provides a low-level addressing system through the use of media access control (MAC) addresses that are uniquely assigned to network interfaces.

Continuing with FIG. 2A, example applications 210 include a spreadsheet 211, a web browser application 212, a word processing application 214, and a video conference platform 216. The proxy server 105 injects the client-side proxy component 221 into any of the illustrated example applications 210. These applications 210 may be the source of phishing attacks detected by the technology described herein.

In FIG. 2A, the proxy server 105 injects the client-side proxy component 221 into the web browser application 212. In one example, injecting the client-side proxy component 221 into the web browser application 212 includes causing a piece of software to run on the application 210 (in this example, the web browser application 212). In one example, the client-side proxy component 221 prompts the user for permission to capture a snapshot. Based on the user granting permission to capture the snapshot, embodiments of the client-side proxy component 221 cause the snapshot manager 236 to capture a snapshot and store the snapshot, for example, as segments of a target duration, such as 5, 10, 15, 20, or 30 seconds, or any other duration. Based on the user not granting permission, certain embodiments disclosed herein are disabled. For example, based on the user not granting permission, the client-side proxy component 221 ends the user session or restricts user access to certain computer functionality or websites.

Continuing with FIG. 2A, illustrated is a process whereby input signals from a pointer 254 are communicated through the operating system to the application 210 and the client-side proxy component 221 running on the application 210. In the example shown, a selection (for example, right-click or left-click) is entered on a mouse controlling pointer 254, which causes a signal to be sent to the input manager 246. In this example, the input manager 246 receives a signal (for example, a scancode) from the keyboard or mouse driver (not shown) and may convert it to a new signal that identifies the selection indicated by the click, for example, as Unicode text. In the illustrated example, the selection is then passed to the active application (the application into which the input is addressed), which in this case is the web browser application 212. In the illustrated example, the web browser application 212 then takes action based on the input (for example, initiates a document upload action). The flow shown in FIG. 2A is one example communication that occurs based on the technology described herein.

FIG. 2B shows that embodiments of the technology described herein use the input manager 246 to copy the user input to the LSASS 234. In the illustrated example, the user input is sent to the web browser application 212. The LSASS 234 may maintain a buffer that stores that last x number of user inputs (for example, keystrokes, clicks, pointer navigations, and the like) received.

Figure 5:
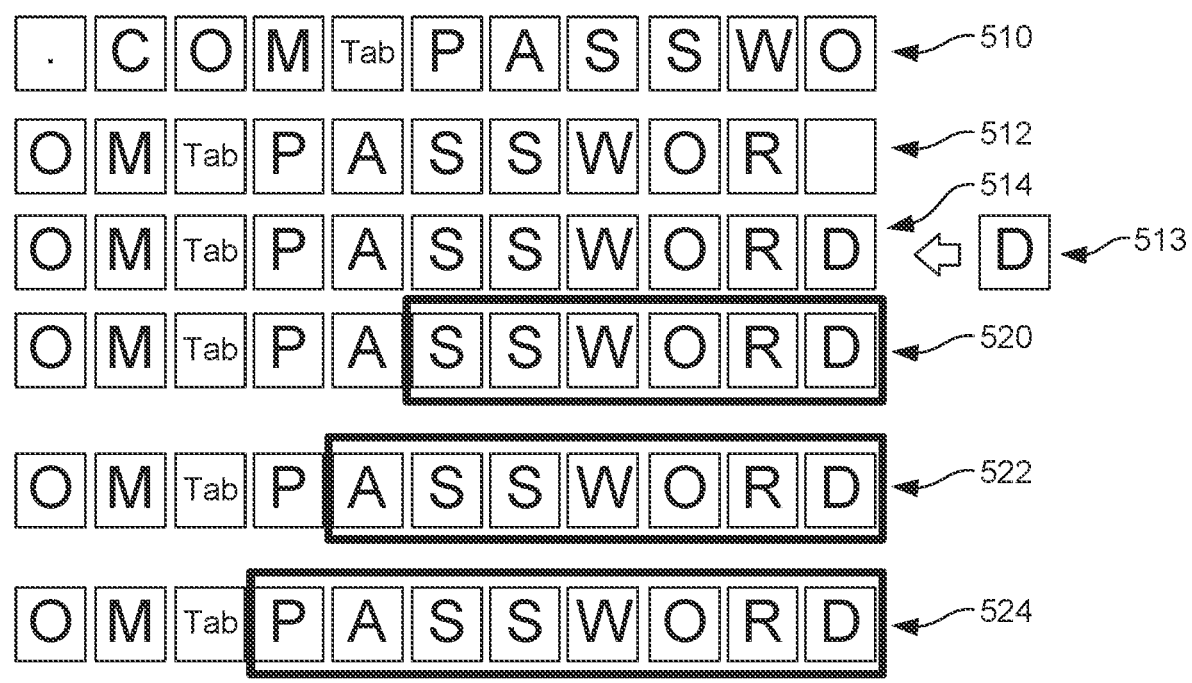
FIG. 5 is a diagram illustrating analysis of keystrokes in an input buffer to detect a credential, in accordance with an embodiment of the technology described herein.

In the context of keystrokes, an example buffer is shown with reference to FIG. 5. As illustrated, the keystroke buffer stores the last 11 characters received. Embodiments of the technology can work with buffers of different sizes. In some embodiments, the buffer holds as many or more keystrokes as are in the longest credential being monitored. For example, with each new keystroke, the content of the buffer is updated to include the most recent stroke and remove the oldest. By way of non-limiting example, at a first point in time, the first content 510 starts with a period and ends with the letter "o." Continuing this example, at a second point in time, the second content 512 starts with an "o" and ends with a space. This content reflects the user entering the keystrokes "r" and a space, causing the period and "c" to be removed. Continuing this example, at a third point in time, the third content 514 reflects the entry of the backspace key to delete the space and the insertion of a "d." This illustrates a special case of buffer management involving the backspace key. In this example, when the backspace key is pressed, the last letter entered is deleted but the backspace itself is not entered as a keystroke into the keystroke buffer. Other control keys, such as shift, cap lock, and the like, may be omitted from or included in the buffer.

As illustrated in FIG. 2C, a keystroke hash is generated from the keystroke buffer and compared to a hash of one or more credentials. Alternatively or additionally, a hash of a partial keyword may be compared to a hash for the keystroke buffer. In both instances, the hash can be generated from the same number of characters. For example, if the password contains eight characters, then a hash of eight characters from the keystroke buffer should be compared to a hash of the password. Both hashes may be generated using the same function. In another example, the partial hash of six characters from the password should be compared with a hash of six keystrokes from the buffer. These options are illustrated again with reference to FIG. 5, where a first hash 520 of the last six strokes is generated. In FIG. 5, a second hash 522 of the last seven strokes is also generated along with a third hash 524 of the last eight strokes. These three hashes could be compared against hashes of different credentials and/or partial credentials. In some embodiments, when a match is made between a hash from the keystroke buffer and a hash of a credential match, then a credential entry event is identified and threat assessment triggered. In some embodiments, a match is detected based on a user copying and pasting a string of characters into the text field. Various threat assessments are illustrated subsequently with reference to FIGS. 10-15.

Turning to FIG. 3, illustrated is a block diagram depicting an architecture 300 used to detect a phishing website, capture a snapshot, and build an administrator portal activity log, in accordance with an embodiment of the technology described herein. As illustrated, architecture 300 includes web browser application 212 running a client-side proxy component 221. Illustrated architecture also includes a proxy server 105 and a distributer server system 302 containing a video analyzer service 310 configured to access and utilize logic components 312, 314, and 316; a message queue 320; an activity service 330; an activity media enricher 340; a database 350; and administrator portal activity log 360. In one example, the distributer server system 302 corresponds to the server 106 of FIG. 1 and/or the distributed computing environment 1900 of FIG. 19.

In some embodiments, the proxy server 105 initiates a client-side proxy component 221, such as a JavaScript client-side proxy component, in the application layer 210 (FIG. 2). In one example, the proxy server 105 initiates the client-side proxy component 221 in response to a triggering event, such as starting the application, connecting the application to the internet, or logging into an enterprise portal, among other suitable triggering events.

In one embodiment, initiating the client-side proxy component 221 within the application layer 210 includes prompting the user for permission to capture a snapshot. An example interface presented is illustrated in FIGS. 6A, 6C, 7, and 8. Based on the user granting permission to capture the snapshot, embodiments of the client-side proxy component capture a snapshot and locally store the snapshot, for example, as segments of a target duration, such as 5, 10, 15, 20, or 30 seconds, or any other duration. Based on the user not granting permission, certain embodiments disclosed herein are disabled. For example, based on the user not granting permission, the client-side proxy component or the proxy server end the user session or restrict user access to certain computer functionality or websites.

Assuming the user approves the request to allow snapshot capture, the client-side proxy component 221 monitors user activity for occurrence of a target action, such as a credential input, a print action, a clipboard action, or a file action, among other actions. Upon detection of the target action being performed within the application on the user device, embodiments of the client-side proxy component send activity details to the proxy server 105. In addition to sending the activity details, embodiments of the client-side proxy component 221 send the snapshot associated with the activity details to the proxy server 105.

As a first example, activity details includes that the user is performing a file action, such as a file download, within the URL for www.outlook.com. In this example, the activity details include a first indication that the user is performing the file download action, a second indication that the action is being performed within www.outlook.com, a third indication of an event identification (ID), and a fourth indication of the user ID. In this example, embodiments of the client-side proxy component 221 also send the snapshot associated with the activity details to the proxy server 105.

As a second example, activity details include that the user is performing a clipboard action, like a paste operation, such as a shortcut within the keyboard (for example, Ctrl+V), performed within a text field in a web browser application 212 (FIG. 2). In this example, the activity details include a first indication that the user is performing the paste action, a second indication that the action is being performed within a particular text box or a particular website, a third indication of an event identification (ID), and a fourth indication of the user ID. In this example, embodiments of the client-side proxy component 221 also send the snapshot associated with the activity details to the proxy server 105.

In some embodiments, the client-side proxy component 221 uses the application context and network context, among other data, to identify a threat or lack thereof. The client-side proxy component 221 may receive network status information from components. The network status information may include the URL, an internet protocol (IP) address, a process ID, a server name indication (SNI), domain information (for example, domain name), and other characteristics of the ongoing communication sessions between outside resources. In some embodiments, the client-side proxy component 221 communicates network status or application context information to the proxy server as event data.

Embodiments of the proxy server 105 receive the event ID, the snapshot associated with the event ID, and the user ID. Based on these activity details, the proxy server 105 performs a preliminary threat analysis. Based on the preliminary threat analysis, the proxy server 105 determines that the target action may violate the security policy. In order to perform a more thorough threat analysis, embodiments of the proxy server 105 generate an event record including the event ID, the snapshot associated with the request, and the user ID. In some embodiments, the proxy server 105 publishes the data in the event record to the message queue 320 for processing. In some embodiments, the activity details and/or the snapshot are sent to the proxy server without performing the preliminary threat analysis. In this example, activity details and the snapshot are communicated to the proxy server in response to the client-side proxy component 221 determining that the user input corresponds to a target action. In embodiments where a preliminary threat analysis performed by the proxy server 105 is inconclusive or classified as unknown, the event data includes an "unknown" classification. In response to receiving the unknown classification, embodiments of the proxy server 105 communicate a request for a snapshot captured by the snapshot manager 236 (FIG. 2) of the client-side proxy component 221.

In some embodiments, the message queue 320 includes a data structure that stores the event record corresponding to a particular event (indicative of a target action) for downstream processing. The message queue 320 includes any suitable queue, such as a simple queue (for example, a first-in first-out queue), a circular queue, a priority queue, or a double-ended queue (deque). Embodiments of the message queue 320 receive from the proxy server 105 data structures for each event record.

In one example, video analyzer service 310 corresponds to a component implementing video analyzer logic to analyze and label the event data. In one embodiment, the video analyzer service 310 corresponds to a snapshot phishing machine learning model.

In some embodiments, video analyzer service 310 performs certain image recognition operations to determine snapshot features. In some embodiments, the architecture 300 includes storage devices, which provides access to various logic modules accessible by a snapshot phishing machine learning model. In one example, the snapshot phishing machine learning model attempts to reclassify the previous threat, which was classified as "unknown." The snapshot phishing machine learning model classifies the threat attempt using any of the logic components discussed herein.

In some embodiments, the video analyzer service 310 implements snapshot feature detection logic 312 configured to identify snapshot features in a snapshot. Embodiments of the snapshot feature detection logic 312 employ a You Only Look Once (YOLO) methodology, Region-based Convolutional Neural Network (R-CNN) methodology, Single-Shot Detector (SSD) methodology, or any suitable model that may detect multiple objects in different classes, locations, and scales. Embodiments of the snapshot feature detection logic 312 train the snapshot phishing machine learning model using labeled or unlabeled snapshots from various classified phishing scenarios, such as those having the classifications discussed herein. In this manner, the snapshot feature detection logic 312 may produce more accurate results based on snapshots having different colors, fonts, shades, textures, and other image parameters.

In some embodiments, the video analyzer service 310 implements snapshot training logic 314, for example, to train the snapshot phishing machine learning model. In one embodiment, the snapshot training logic 314 includes computing logic to train the snapshot phishing machine learning model. The snapshot training logic 314 may determine snapshot feature data used to train the snapshot phishing machine learning model. In one embodiment, the snapshot training logic 314 determines the snapshot feature data used to train the snapshot phishing machine learning model via any suitable process. For example, the snapshot training logic 314 determines the snapshot feature data via any suitable engineering process, which may include at least one of the following steps: brainstorming or testing features, deciding which features to create, creating the features, testing the impact of the created features on an object or training data, and iteratively improving features. Embodiments of the video analyzer service 310 determine the snapshot feature data using any suitable computations, including, but not limited to, (1) numerical transformation (for example, taking fractions or scaling), (2) employing a category encoder to categorize data, (3) clustering techniques, (4) group aggregation values, (5) principal component analysis, and the like. In some embodiments, the snapshot training logic 314 assigns different levels of significance to the snapshot feature data, such that certain snapshot feature data that has a higher level of significance are weighted accordingly when the video analyzer service 310 trains a machine learning (ML) model. In this manner, the snapshot training logic 314 may prioritize and/or rank snapshot features to improve identifying, tracking, and/or classifying the object.

In some embodiments, the video analyzer service 310 implements snapshot phishing classification logic 316, for example, as part of a snapshot phishing machine learning model. In one embodiment, the snapshot phishing classification logic 316 includes computing logic to detect, track, and classify the snapshot captured and/or formatted by the snapshot manager 236 of the client-side proxy component 221. In some embodiments, the snapshot phishing classification logic 316 determines various snapshot features contained in the snapshot. Example snapshot features include, but are not limited to, a text font size, a text style, a text color, a text language, a text arrangement, a color, a shape, a bounded box, or a graphical user interface (GUI) element.

In some embodiments, the video analyzer service 310 employs snapshot phishing classification logic 316 to implement classification methodologies used to determine a context and classification of snapshot features identified in the snapshot. In some embodiments, the snapshot phishing classification logic 316 employs the snapshot phishing machine learning model that is trained and generated by video analyzer service 310. The snapshot phishing classification logic 316 may define logic for using the snapshot phishing machine learning model to detect, track, and classify the snapshot features. For example, the snapshot phishing machine learning model may include a deep learning model, a neural network model, a logistic regression model, a support vector machine model, and the like. Example snapshot phishing machine learning models may employ a YOLO methodology, a faster region-based convolutional neural network (RCNN) methodology, SSD methodology, and the like.

The video analyzer service 310 may employ any suitable classification or prediction algorithm to classify and/or predict the identity of a snapshot based on, for example, snapshot feature data, the network context information, the application context information, and/or any information contained in the threat report. Example snapshot features include, but are not limited to, a text font size, a text style, a text color, a text language, a text arrangement, a color, a shape, a bounded box, or a GUI element. It should be understood that the embodiments disclosed herein may be broadly applied to predict any suitable object, in addition to or other than those described herein.

In some embodiments, the video analyzer service 310 employs any of the aforementioned logic or machine learning models to determine enriched-contextual event data for the event record. For example, the video analyzer service 310 uses the snapshot features data as the enriched-contextual event data. In some embodiments, video analyzer service 310 determines, for each event record, corresponding enriched-contextual event data. In one example, the enriched-contextual event data is determined from the snapshot and activity details. Embodiments of the video analyzer service 310 update the event record to include the enriched-contextual event data. For example, the video analyzer service 310 adds the enriched-contextual event data to the event data, for example, as new records or other data structures to generate updated event data. In one embodiment, the updated event data is appended to the message queue 320. For example, the updated event data replaces the prior event data. In another example, the enriched-contextual event data is appended to the event data in the message queue 320 to generate the updated event data.

In some embodiments, the activity service 330 accesses the event data or the updated event data from the message queue 320 and processes for storage in the database 350. In one embodiment, the activity service 330 receives the event data or the updated event data from the message queue 320 and reformats the event data or the updated event data. For example, the message queue 320 can include a data structure that is different from the data structure of the database 350. As a result, embodiments of the activity service 330 reformat the event data or the updated event data so that it can be stored in the database 350.

In some embodiments, the activity media enricher 340 accesses the updated event data and determines enriched-contextual event data. For example, the activity media enricher 340 determines from the snapshot contextual information including a time during which the snapshot was captured, an annotation (for example, a bounded box, text, or other added markings) on the region within the snapshot where the user performed the target action, a classification indicating that the target action corresponds, for example, to a file action, among other enriched-contextual event data. In one example, the activity media enricher 340 adds this enriched-contextual event data to the updated event record.

In one embodiment, activity media enricher 340 determines a security mitigation score based on the snapshot, the event data, the updated event data, or the enriched-contextual event data. In one example, the security mitigation score is indicative of an urgency or severity of the potential security breach associated with a screenshot. In some embodiments, the activity media enricher 340 determines a corresponding security mitigation score for each event detected in event data. Certain security mitigation scores are calculated based on the snapshot, the event data, the updated event data, or the enriched-contextual event data. For example, the security mitigation scores are calculated for each screenshot based on a freshness, uniqueness to the user, type of target activity, urgency to the user or enterprise, and so forth. In the context of a score based on urgency or importance to the user, an importance level can indicate how important or imperative it is that the target action be mitigated or rectified, while an urgency level may indicate how soon the target action should be mitigated or rectified. Some embodiments of activity media enricher 340 determine a security mitigation score corresponding to urgency, importance, or both.

In some embodiments, the activity media enricher 340 only stores to the database 350 certain event data having at least a threshold score. In one embodiment, certain event data determined to have a security mitigation score above a score threshold is automatically stored on the database 350. For example, suppose the scores are normalized to be between 0 and 100, such that only event data with a security mitigation score above a score of 90, or any other score threshold, are stored to the database 350.

In one example, the security mitigation score corresponds to a value indicative of a classification for the security-related issue and provides an indication of a level of impact. In one example, the host authority value is binary such that it indicates whether a corresponding screenshot and event data corresponds to a low-impact security-related issue or a higher-impact security-related issue, which can be indicated via a key-value pair or any other data structure that is associated with the corresponding updated event data. In one example, the security mitigation score corresponds to a value that is compared against one or more thresholds, such that a security mitigation score that is below (or above) the threshold is classified as a "low-impact security-related issue," and a security mitigation score that is above (or below) a threshold is classified as a "higher impact security-related issue," or any other suitable classification (for example, natural). In one example, the thresholds are dynamic and trained to be updated based on the neural network and/or the security policy described herein.

The database(s) 350 generally stores information generated and determined by the components of architecture 300. For example, the database 350 stores the updated event data for a respective target action, the corresponding snapshot, the corresponding enriched-contextual event data, the corresponding security mitigation score, and/or the corresponding snapshot features, and so forth. In one example, the database 350 ranks the updated event data based on the corresponding security mitigation score.

In one embodiment, the database(s) 350 also stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 can be embodied as one or more data stores or in the cloud.

The administrator portal activity log 360 generally generates an activity feed that provides the data related to one or more snapshots. The administrator portal activity log 360 may only be accessible to authorized accounts of authorized personnel, such as higher ranking personnel within an enterprise. In some embodiments, the administrator portal activity log 360 polls and receives, for respective target actions, from the database 350 the updated event data, the corresponding snapshot, the corresponding enriched-contextual event data, the corresponding security mitigation score, and/or the corresponding snapshot features, and so forth. The administrator portal activity log 360 may be a useful tool to allow authorized personnel to identify future potential security threats.

FIG. 4 is a sequence flow diagram depicting the interaction of components of the architecture of FIG. 3 to detect a phishing website, capture a snapshot, and build an activity log, in accordance with an embodiment of the technology described herein. Although the illustrated embodiment includes a web browser application 212, it should be understood that these embodiments are applicable in association with any suitable application.

As illustrated, prior to, during, or after initiating the web browser application 212, the client-side proxy component 221 (FIG. 2A) requests user permission to capture the snapshot. For example, the client-side proxy component 221 running within the web browser application 212 causes the web browser application 212 to generate a pop-up promoting the user to make a selection to allow screen capturing. In this example, if the user does not grant permission, the client-side proxy component 221 or the proxy server 105 restricts user access to certain hosts 104. On the other hand, in response to the user's approval, the client-side proxy component 221 running within the web browser application 212 begins screen capturing and monitoring the user's input for detection of a target action.

Upon detection of the target action, the client-side proxy component 221 running within the web browser application 212 communicates the event data and the snapshot to the proxy server 105. By way of non-limiting example, suppose that the proxy server 105 receives event data including (1) an event ID indicating that an upload operation (in this example, this is the target action) was attempted, (2) a snapshot including a screen recording of the 10 seconds during which the user was performing this target action, and (3) the user ID indicating that this target action was attempted by the user associated with the email address user@companyname.net. In this example, the proxy server 105 generates an event record including this event data and communicates the event record to other components of the architecture 300 (FIG. 3).

For example, the proxy server 105 publishes the event record to a downstream component, such as the message queue 320. The proxy server 105 can request that the video analyzer 310 (FIG. 3) determines snapshot features. The video analyzer 310 may determine snapshot features that are added to the event record for storing to the message queue 320. In this example, the activity service 330 (FIG. 3) accesses the event record and stores the event data in database 350 (FIG. 3). In some embodiments, the activity media enricher 340 (FIG. 3) accesses the updated event data and determines enriched-contextual event data. For example, the activity media enricher 340 determines from the snapshot contextual information including a time during which the snapshot was captured, an annotation (for example, a bounded box, text, or other added markings) on the region within the snapshot at which the user was selecting the upload command and the URL associated with the upload command, a classification indicating that the upload command corresponds to a file action, among other enriched-contextual event data. In this example, the video analyzer 310 adds this enriched-contextual event data to the event record to generate an updated event record stored in the message queue 320 and/or stored to database 350. In this example, the administrator portal activity log 360 accesses the updated event record to generate an activity log.

Various security mitigations may be taken when a threat is detected, for example, based on the snapshot. A user and/or system administrator may specify the mitigation action taken when a threat is detected or identified by distributer server system 302. Different mitigation actions may be specified for different threat classifications. One type of mitigation is threat reporting. Useful sensor data and telemetry, as well as snapshots, may be sent to a cloud protection service associated with an organization (for example, employer) managing a user device. The same information may be made accessible to a user of the device being monitored. Phishing determinations may also be shared (considering all compliance and privacy guidelines) with a centralized threat protection service running within the distributer server system 302, for example, that would benefit from leveraging the phishing data to better protect customers from phishing. The threat protection service or any components of the distributed server system 302 may employ the snapshot phishing machine learning model to improve detection and mitigation of phishing attacks.

In some embodiments, the snapshot is communicated only in certain instances. For example, the snapshot is communicated based on the threat assessment resulting in an "unknown classification," based on a mismatch between the present network context and an expected network context for the application being inconclusive, based on a snapshot not having previously been taken for this user within a threshold period of time. With respect to the latter case, the threshold period of time may be a preset time period or a dynamically variable period of time. In the context of a preset time period, embodiments disclosed herein restrict sending the snapshot until the preset time period has expired. Example preset time periods include any number of minutes, hours, days, weeks, months, or any suitable time period. In this manner, bandwidth is preserved and computational resources are conserved since the snapshot is only captured or communicated at an infrequent rate. In some embodiments, the distributed server system 302 may bypass the period of time to request a snapshot. In this manner, the distributed server system 302 may request a snapshot when it determines that a phishing attempt of a certain type is believed to have occurred.

Figure 6A:
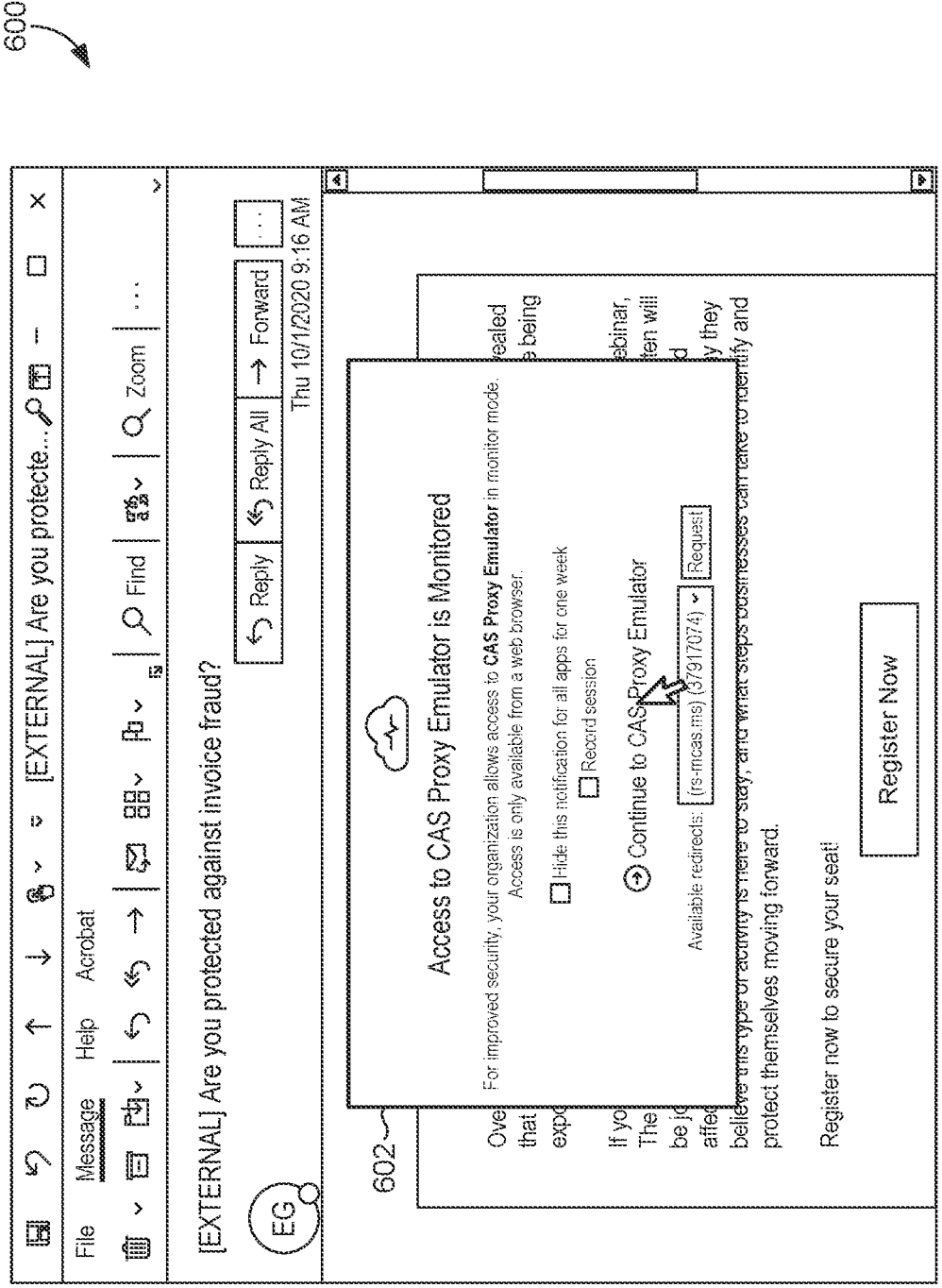
FIGS. 6A, 6B, 6C, 6D, and 6E are diagrams showing example screenshots of user interfaces during a phishing attempt.
Figure 6B:
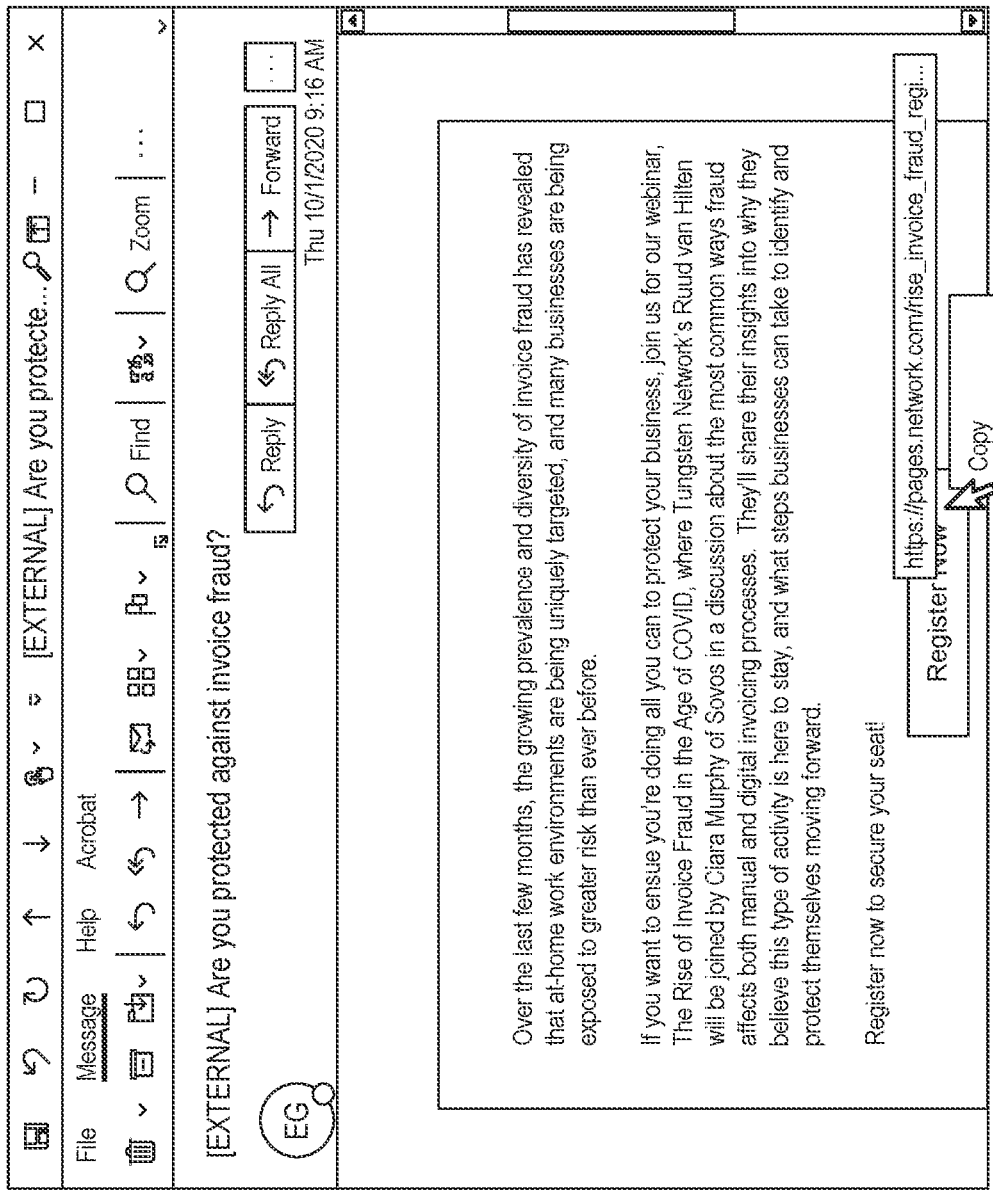
Figure 6C:
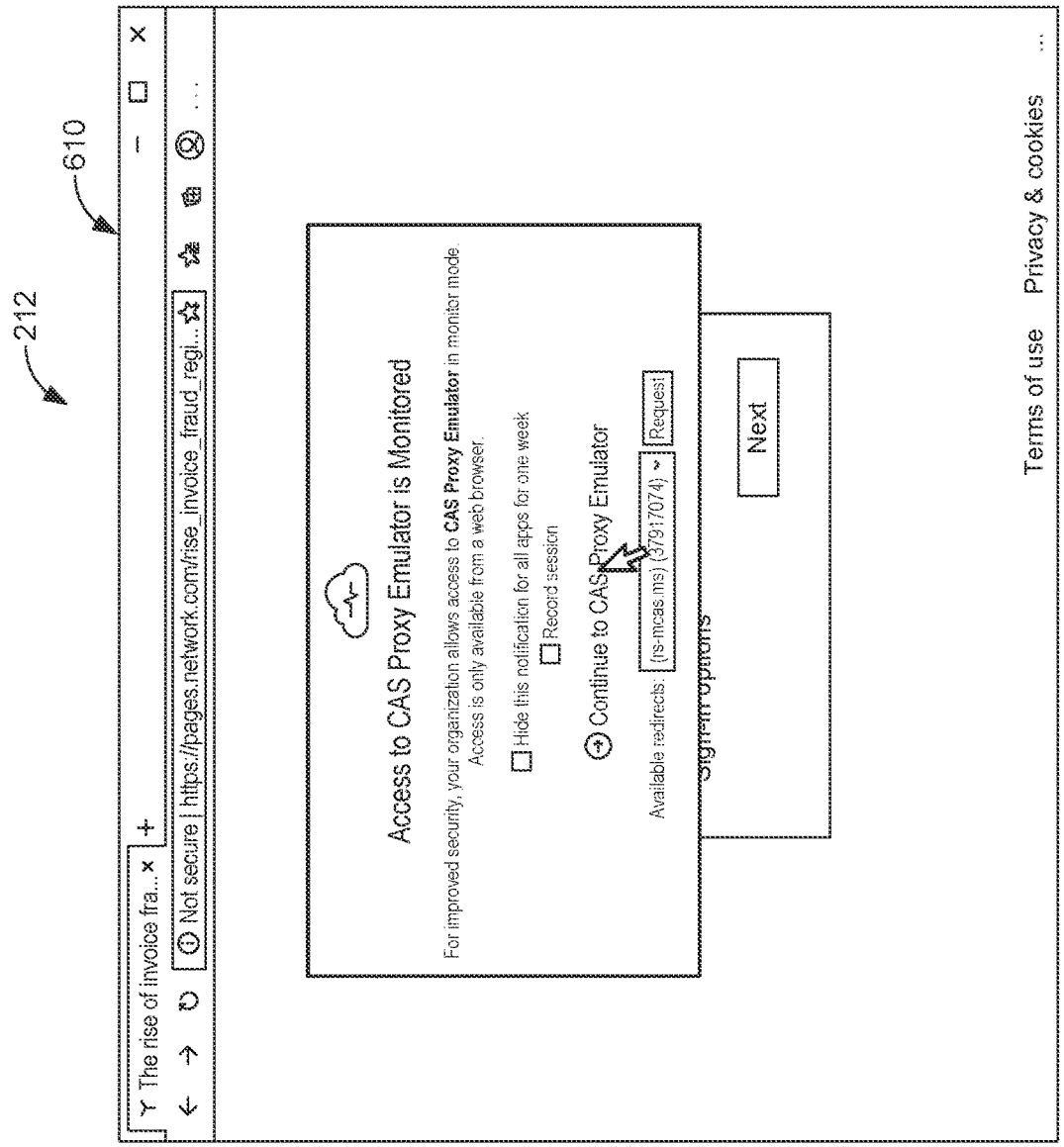

FIGS. 6A, 6B, and 6C illustrate a phishing attack that can be detected by the technology described herein. In FIG. 6A, the user opens up an email application 600 and is prompted to approve snapshot capture via window 602. In this example, the user approves the request to capture the snapshot, and the approval is received by proxy server 105 (FIG. 1) to cause a client-side proxy component 221 (FIG. 2A) to snapshot capture. In FIG. 6B, and after approving the snapshot capture request, the user left-clicks on a "register now" link in the email 600 from a legitimate business and copies the hyperlinked URL. As discussed above, copying text is an example target action triggering snapshot capture within the application running the email 600 if the application has the client-side proxy component 221 (FIG. 2A). As illustrated in FIG. 6C, the browser application 212 opens based on the user wanting to paste the copied hyperlinked URL into the search bar. As illustrated in FIG. 6C, the browser application 212 prompts the user again to approve snapshot capture. In this example, the user approves the request to capture the snapshot. The phishing page 610 opens in FIG. 6D based on the pasted URL link.

Figure 6D:
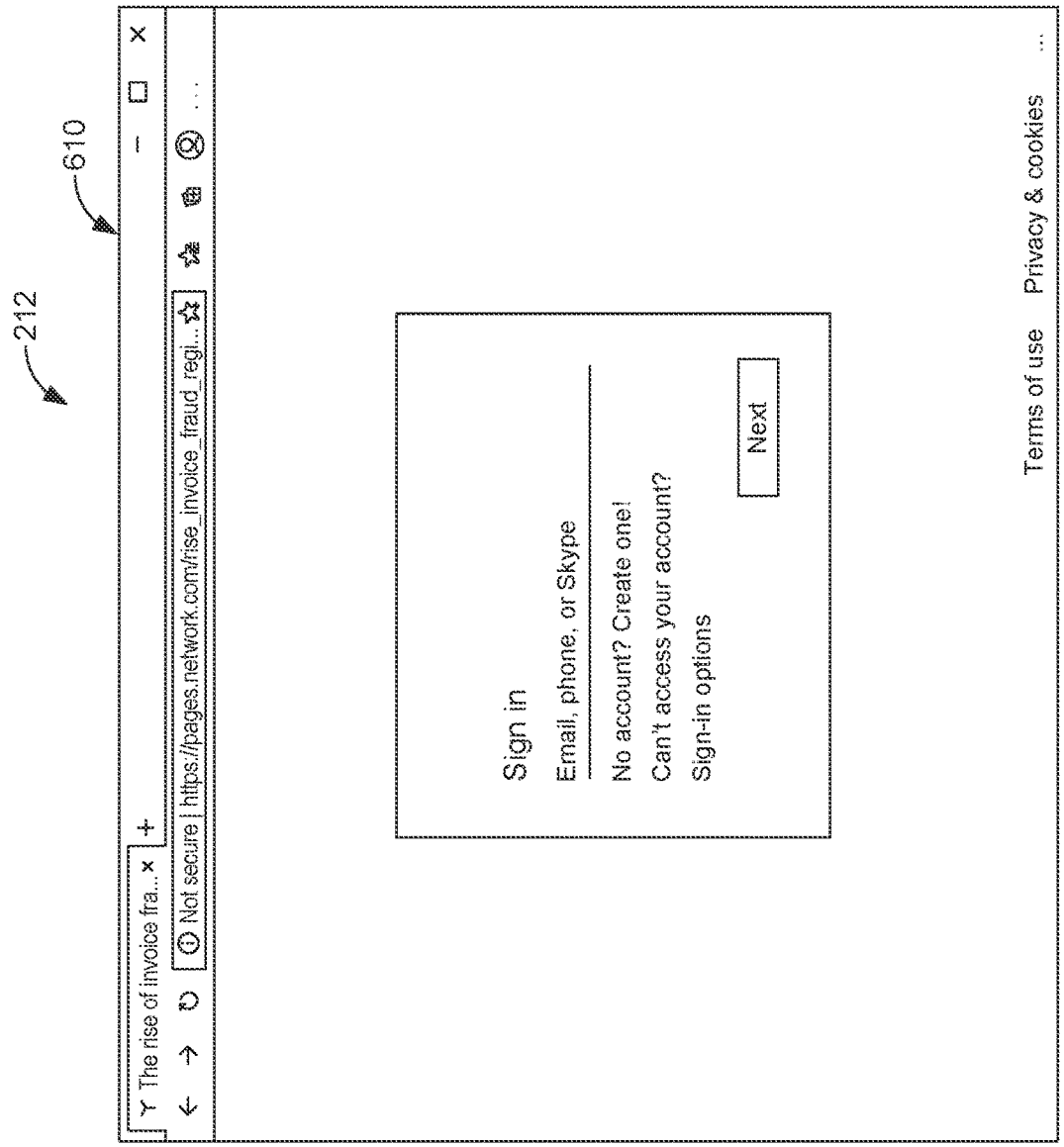
Figure 6E:
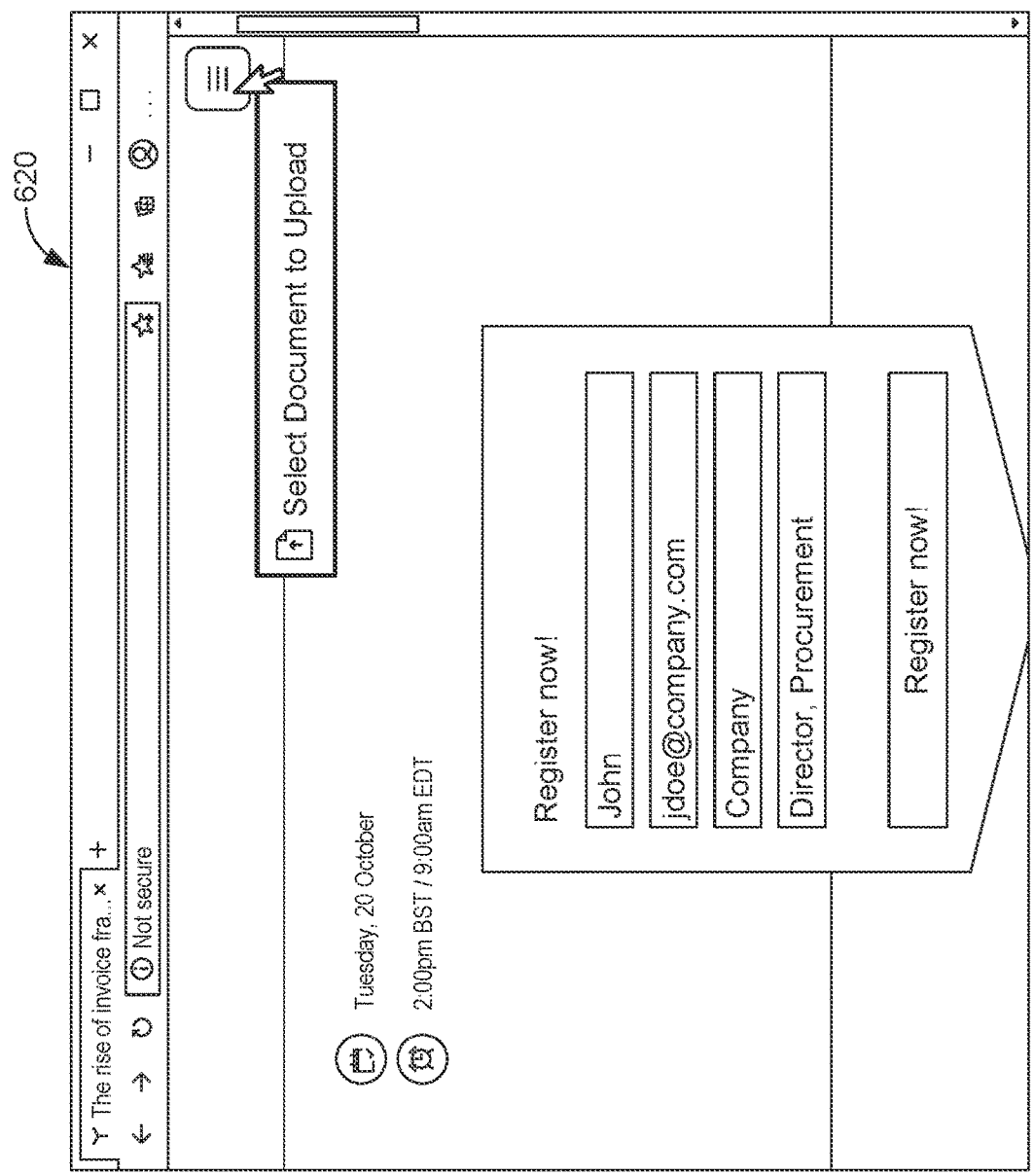

In FIG. 6D, illustrated is an embodiment of a browser application 212 asking for the MICROSOFT® credentials after the user pastes the URL into a search bar of the web browser application 212. On a second load, shown in FIG. 6E, the legitimate page 620 opens. This situation may be caused by the trusted company being compromised. A hacker may exploit an A/B testing feature, used by webpage analytics to test different versions of a webpage, to present a phishing page. The technology described herein could identify this attack because the target actions of copying and pasting, as well as entering MICROSOFT® credentials in an unauthorized URL would be impermissible. A snapshot and its corresponding snapshot features would facilitate identifying this browser state, for example, based on snapshot features, such as the text arrangement "External" from the email address indicating that the snapshot is from an external source.

A typical security application might miss this attack because the site certificates could appear to be in order. Many security services would not recognize that the password (or other credential) had even been entered absent the snapshot. Indeed, many security services would not capture a snapshot and leverage the logic and snapshot phishing machine learning model disclosed herein. Moreover, certain security services do not provide users with the level of control and customizability disclosed herein. For example, FIGS. 7 and 8 depict example screenshots of a user interface allowing a user to select controls for modifying embodiments of the technology described herein.

Figure 7:
FIG. 7 is a diagram showing an example screenshot of a user interface associated with the capture and send of a snapshot.
Figure 8:
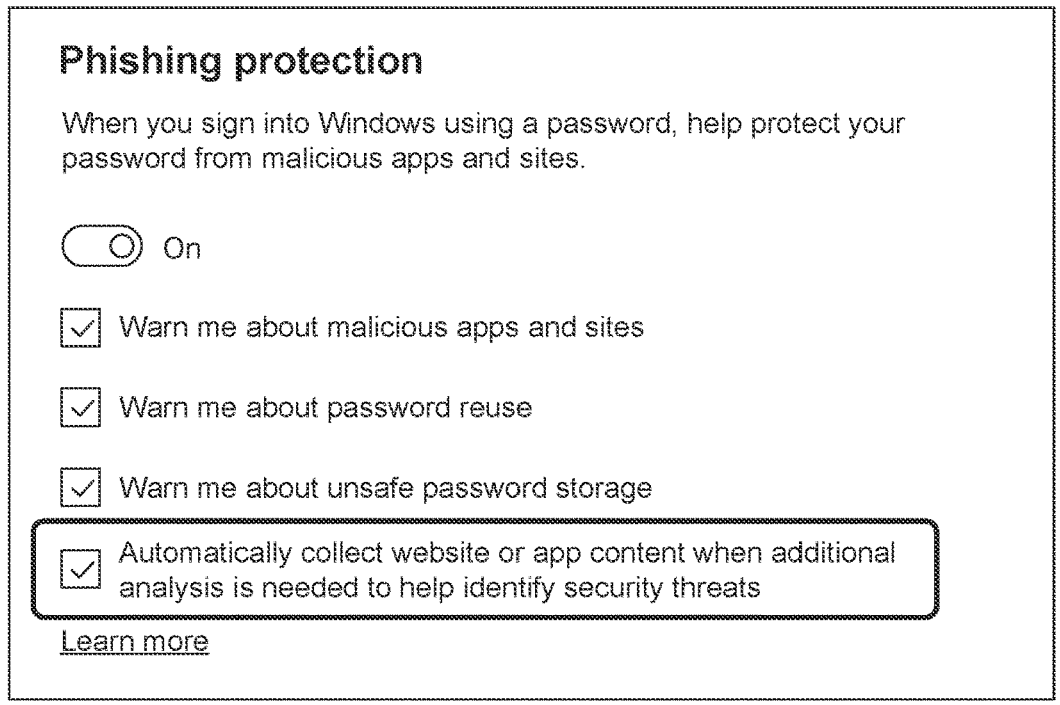
FIG. 8 is a diagram showing an example screenshot of a user interface including selectable controls for modifying embodiments of the technology described herein.

Alternatively or additionally to the permission to screen capture from FIGS. 6A and 6C, FIG. 7 depicts an example screenshot of a user interface 700 for receiving approval to capture and send a snapshot. The user may select the "share my image" control or "share my screen recording" to cause the client-side proxy component 221 to communicate the snapshot to proxy server 105 (FIG. 1).

In some embodiments, the proxy server 105 or the distributed server system 302 controls downstream handling of the snapshot, and such control can be delegated by a user. To help illustrate, FIG. 8 depicts an example screenshot of a user interface 800, including selectable controls for modifying embodiments of the technology described herein. In this example, a user can make various checkbox selections to enable or disable whether to "warn others about suspicious apps and sites," "warn the user about malicious apps and sites," "warn the user about password reuse," or "warn the user about unsafe password storage." Other customizations or controls are possible.

Figure 9:
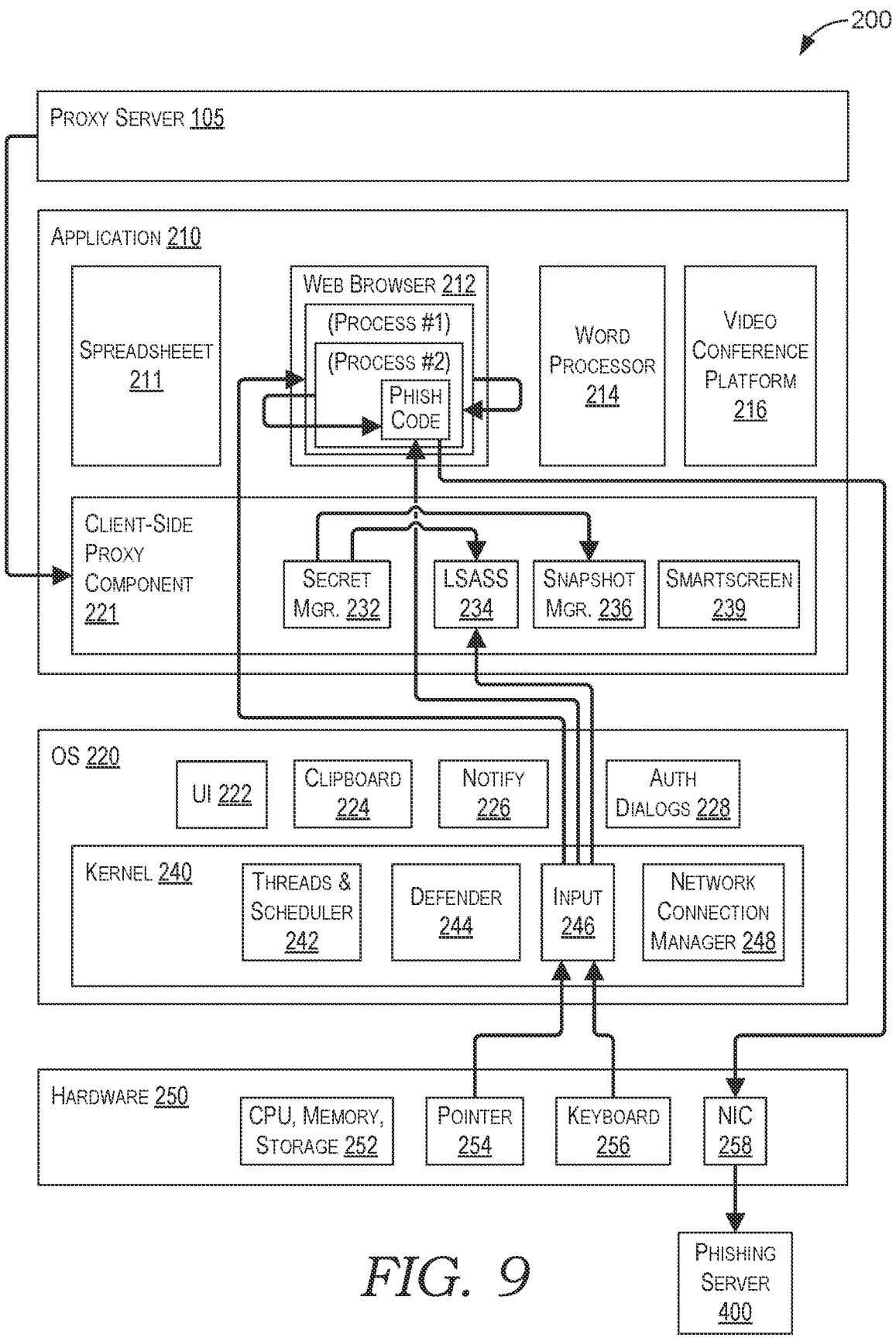
FIG. 9 is a block diagram illustrating activities of components used to detect a phishing website through a web browser application running a client-side proxy component, in accordance with an embodiment of the technology described herein.

Turning now to FIG. 9, the detection of a phishing website is illustrated. Initially, in this example, a series of keystrokes and/or clicks are communicated to the LSASS 234, where the target action is identified in conjunction with other components. As can be seen, the active application is the web browser application 212. When the target action is detected, in this example, a preliminary threat assessment is performed and a snapshot is captured by the snapshot manager 236 of the client-side proxy component 221. The snapshot may be captured and locally cached should another component request the snapshot. In this example, the web browser has two processes running. The first process may be a legitimate process that is not a security threat. The second process may have injected phishing code in the input that is communicated to both processes.

In some embodiments, the network context is determined for both processes but the network communications from the phishing code are shown. In one embodiment, these communications that are directed to the phishing server 400 define at least part of the network context. The distributed server system 302 (FIG. 3) may determine that the network address captured by the snapshot has been associated with a known phishing entity. Because part of the network context involves the address of a known phishing entity, the target action can be identified as a threat. Even if the phishing server 400 had not been on a list of known phishing servers, the threat still could be detected if the network context did not match the expected context for entry of the detected credential. The full context for the target action could also include the application context of the web browser, which includes the page being displayed or application being run.

Moreover, in the instance where analysis of the network traffic results in an unknown classification of the phishing component 400, the snapshot captured by the snapshot manager 236 can be requested and analyzed for further classification of the phishing attempt. For example, the snapshot of the web browser application 212 includes snapshot features, such as font types and branding colors, that do not match those of a safe process running on the web browser application 212. In this example, the snapshot would capture these snapshot features and communicate them to the distributed server system 302 as discussed herein.

Figure 10:
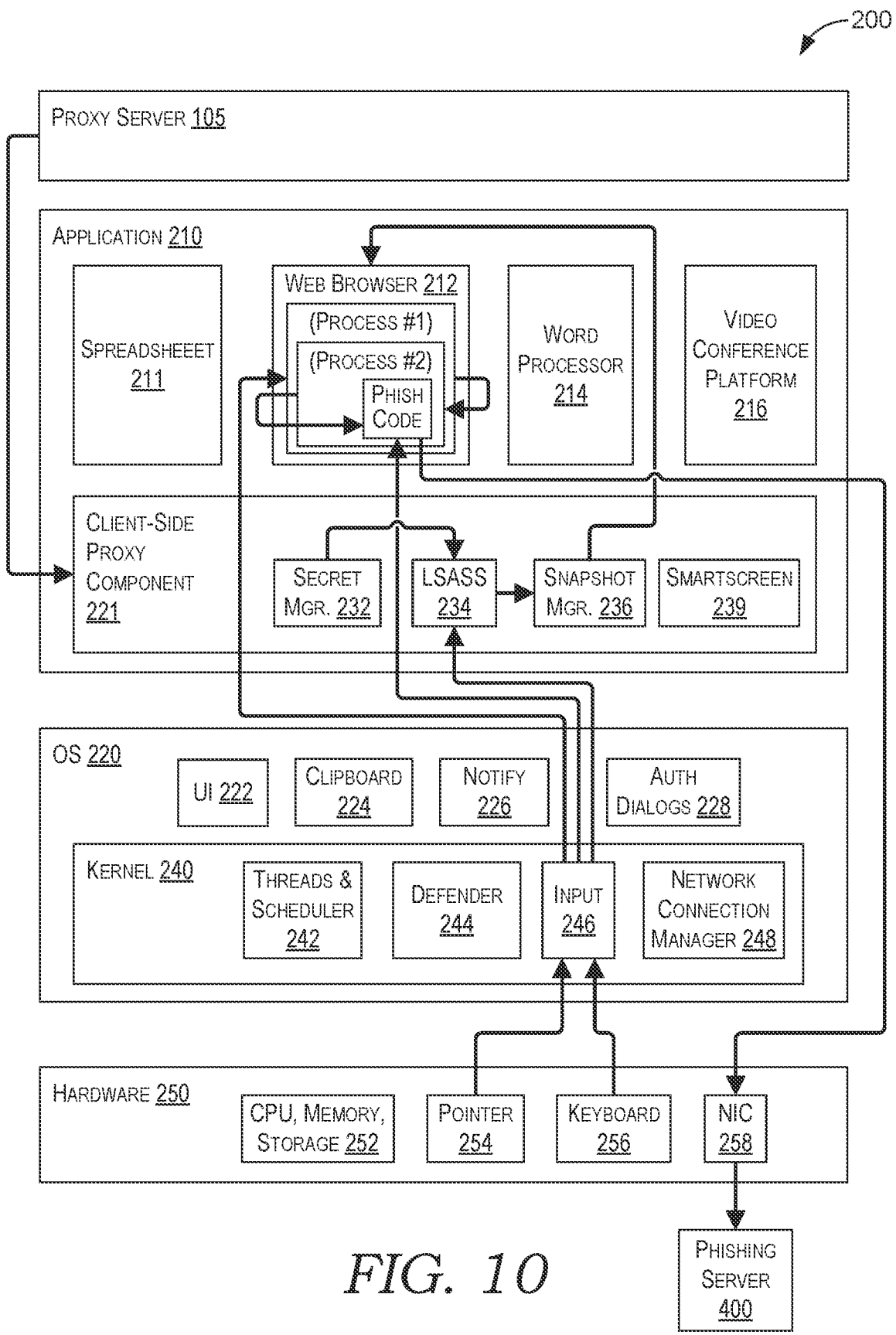
FIG. 10 is a block diagram illustrating activities of components used to detect a man-in-the-middle associated with a web browser application running a client-side proxy component, in accordance with an embodiment of the technology described herein.

Turning now to FIG. 10, the detection of a man-in-the-middle attack is illustrated. A man-in-the-middle attack typically includes two entities: (1) a victim, the entity with which the victim is trying to communicate, and (2) the "man in the middle," who is intercepting the victim's communications. Generally, the victim is not aware of the man in the middle. With a man-in-the-browser attack (MITB), an attacker needs a way to inject malicious software, or malware, into the victim's computer or mobile device. By clicking on a link or opening an attachment in the phishing message, the user can unwittingly load malware onto their device. After clicking on the link or opening the attachment in the phishing message, the malware records the data sent between the victim and specific targeted websites, such as financial institutions, and transmits it to the attacker. The malware in this scenario is the phish code loaded into the web browser application 212.

Initially, a series of keystrokes or clicks are communicated to the LSASS 234, where the target action is identified in conjunction with other components, such as the SmartScreen component 239. In this example, the active application is the web browser application 212. The arrangement and communications in FIG. 10 are similar to those in FIG. 9, except that in FIG. 9 the attack was based on a phishing website. In FIG. 10, the website is safe, but malware code in the web browser copies keystrokes and/or selections, and sends it to a destination, such as the phishing server 400, that is not appropriate for the application context and could also be on an identified phishing list.

By employing the snapshot manager 236 disclosed herein, the snapshot of the phishing message or UI element associated with the malicious link or attachment can be captured and communicated to improve malware classification and threat assessment. For example, the captured snapshot could cause the distributed server system 302 to notify the user, at or near real-time, to not open the link or attachment in the phishing message.

Figure 11:
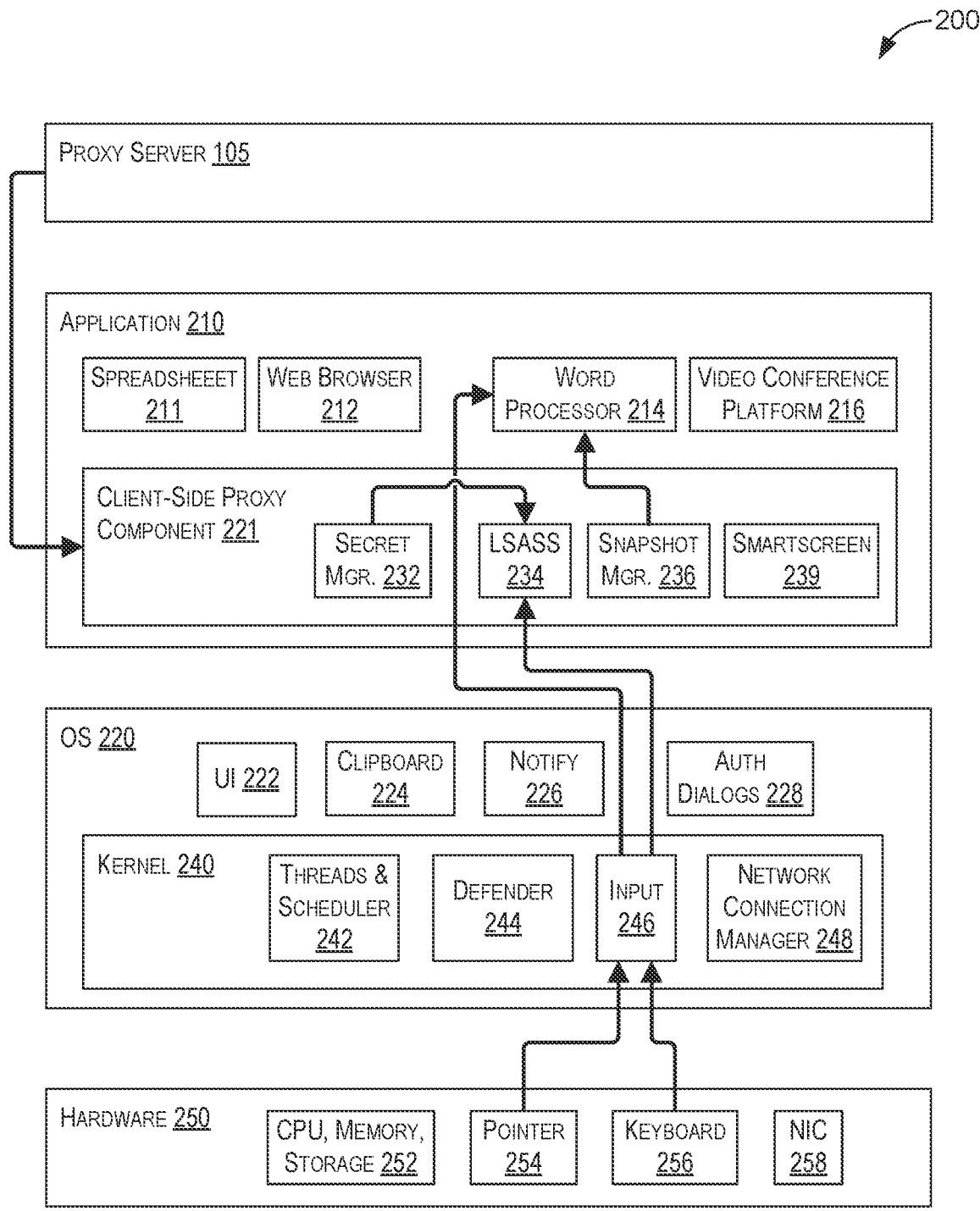
FIG. 11 is a block diagram illustrating activities of components used to detect a phishing attempt through a word processor application running a client-side proxy component, in accordance with an embodiment of the technology described herein.

Turning now to FIG. 11, the detection of a phishing attack in a document is illustrated. Initially, in this example, a series of keystrokes or clicks are communicated to the LSASS 234, where the target action is identified in conjunction with other components, such as the SmartScreen component 239. As can be seen, the active application is the word processing application 214. In this scenario, a network context may not be involved. Simply detecting the user performing a target action (even as plain text) in a document running the client-side proxy component 221 may be enough to identify a threat. Indeed, phishing attacks can occur through documents and other files containing macros that generate a phishing interface. The interface may receive a target action triggering snapshot capturing. The macro can collect sensitive information and communicate it via any suitable software application or some other method. In some embodiments, capturing a snapshot of the application in which the user is performing the target action provides additional details, such as snapshot features, that further classify and improve threat assessment.

Figure 12:
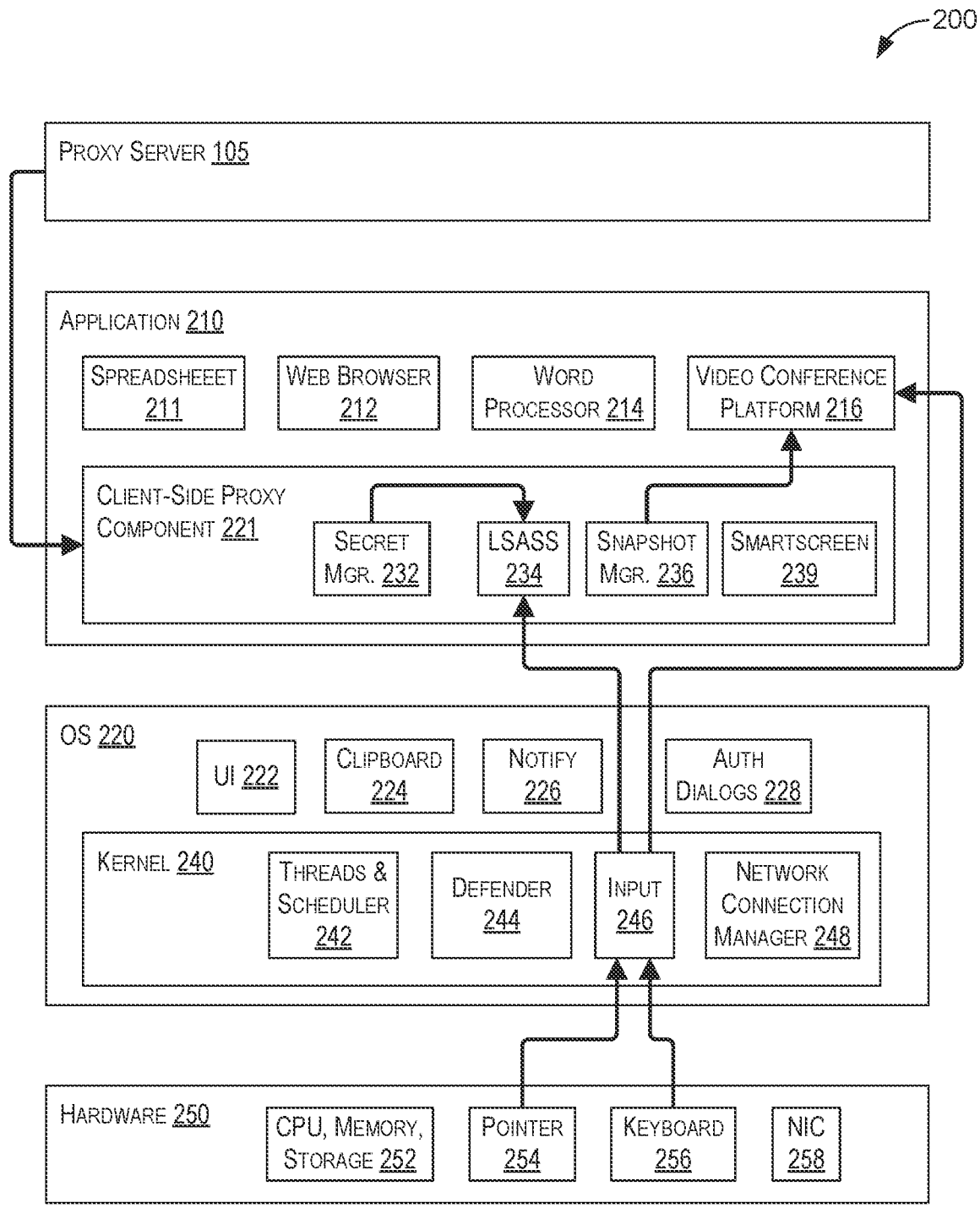
FIG. 12 is a block diagram illustrating activities of components used to detect a phishing attack through a video conference platform running a client-side proxy component, in accordance with an embodiment of the technology described herein.

Turning now to FIG. 12, the detection of a phishing attack in a video platform is illustrated. Initially, in this example, a series of keystrokes or clicks are communicated to the LSASS 234, where the target action is identified in conjunction with other components, such as the SmartScreen component 239. In some embodiments, the snapshot is captured during performance of a target action, although in some embodiments the snapshot is not communicated until requested, for example, by the distributed server system (FIG. 3). As can be seen, the active application is the video conference platform 216 running the client-side proxy component 221. In this scenario, a network context may not be involved. Simply detecting the user performing the target action may be enough to identify a threat. In one embodiment, the captured snapshot provides an indication of the actual state. In some cases, this might just be a bad safety practice by the user rather than a phishing attack. However, phishing attacks can occur through video chats, such as when an entity is posing as technical support. Macros on the platform could also generate interfaces that ask for a password. The interface may ask for a credential to join a meeting, make a recording, or take some other action. The macro can receive a target action from the user and communicate it via email or some other method. In some embodiments, capturing a snapshot of the application on which the user is performing the target action provides additional details, such as snapshot features, that further classify and improve threat assessment.

Figure 13:
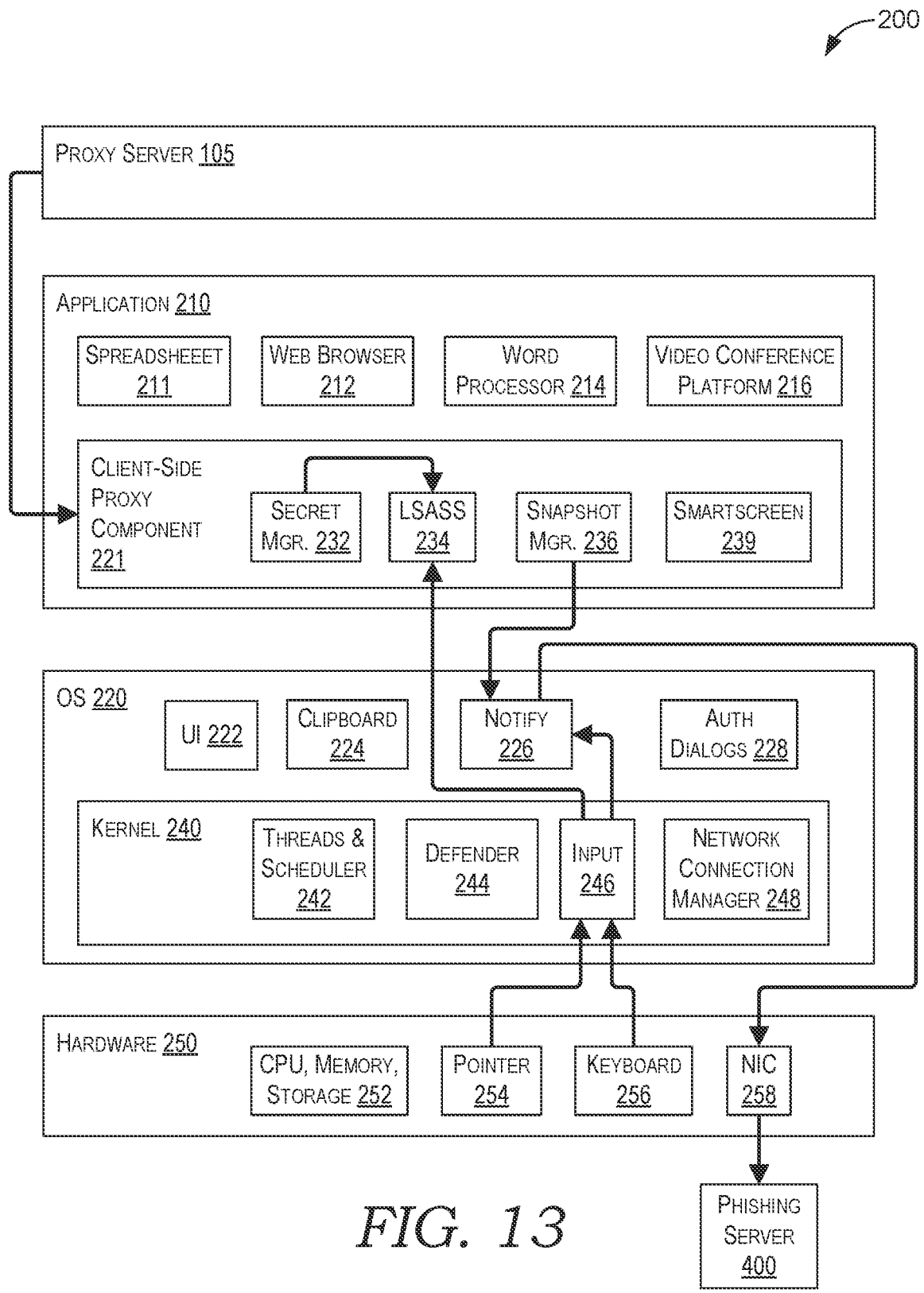
FIG. 13 is a block diagram illustrating activities of components used to detect a phishing attack through an operating system notification, in accordance with an embodiment of the technology described herein.

Turning now to FIG. 13, the detection of a phishing attack in an operating system notification is illustrated. Initially, a series of keystrokes or clicks are communicated to the LSASS 234, where the target action is identified in conjunction with other components, such as the SmartScreen component 239. As can be seen, the active function is the operating system notification function 226. Some legitimate notifications may ask the user to enter credentials, for example, after the token generated by a previous target action expires. The network context may be determined and a snapshot captured. Notice that communications directed to the phishing server 400 define, at least, part of the network context. Interaction with the notification includes certain snapshot features captured by the snapshot manager 236. The distributed server system 302 (FIG. 3) may determine that the network address has been associated with a known phishing entity. Because part of the network context involves the address of a known phishing entity, the target action can be identified as a threat. In some embodiments, a snapshot is captured and communicated to the distributed server system 302. With the technology described herein, a snapshot may provide additional visual details, such as snapshot features, that are not identifiable by the network sensor at the operating system level. In this manner, more information is obtained to improve threat detection, classification, and mitigation. This allows the phishing attempt to be correctly identified and mitigated. Even if the phishing server 400 and corresponding visual identifiers have not been on a list of known phishing servers or malicious content, the threat still could be detected if the snapshot features include features that correlate or correspond to another known phishing server or malicious content associated with similar snapshot features. The full context for performing the target action could also include the application context and the network context of the notification, which includes the application that requested or triggered the notification and network activity, respectively.

Figure 14:
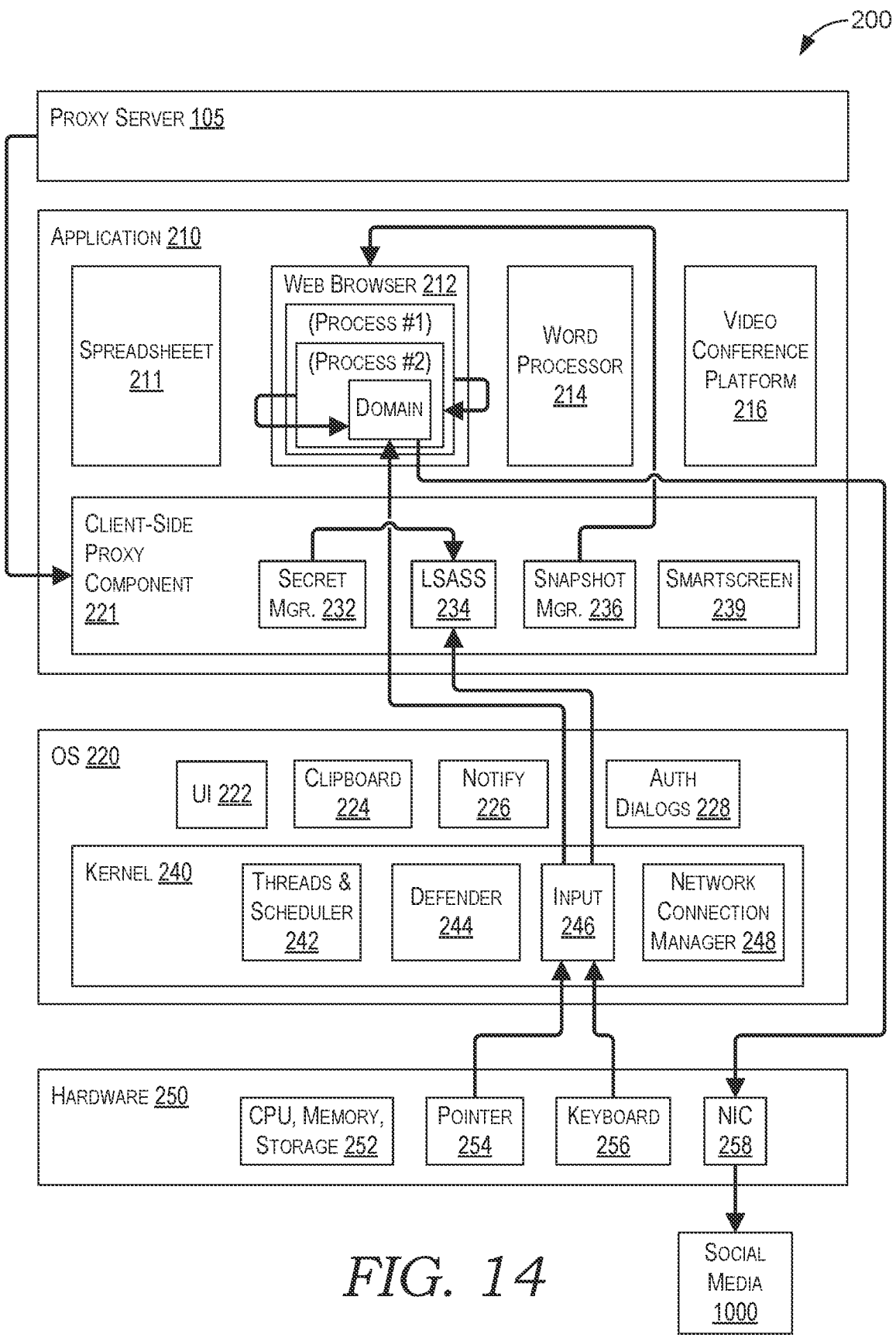
FIG. 14 is a block diagram illustrating activities of components used to detect password reuse, in accordance with an embodiment of the technology described herein.

Turning now to FIG. 14, the detection of password reuse (for example, copying and pasting the password into a text field), within a social media 1000 account, is illustrated. Initially, a series of keystrokes or clicks are communicated to the LSASS 234, where the target action is identified in conjunction with other components, such as the SmartScreen component. As can be seen, the active application is the web browser application 212 running the client-side proxy component 221. When the target action is detected, a threat assessment is performed. The web browser has two processes running, but in this case both are legitimate.

The network context may be determined for both processes. The distributed server system 302 (FIG. 3) may identify that the network address is from a trusted source, but not a trusted source associated with the password. This may indicate password reuse, which occurs when a person uses the same password with multiple accounts. To verify the identity of the source, the snapshot manager 236 could capture a snapshot. If distributed server system 302 determines the identity of the source to a threshold percent of certainty, the snapshot would not be needed and would be deleted. On the other hand, if the distributed server system 302 determines the identity of the source below a threshold percent of certainty, the snapshot could be requested and then deleted. In this case, a mitigation step could include notifying the user and a system administrator.

Figure 15:
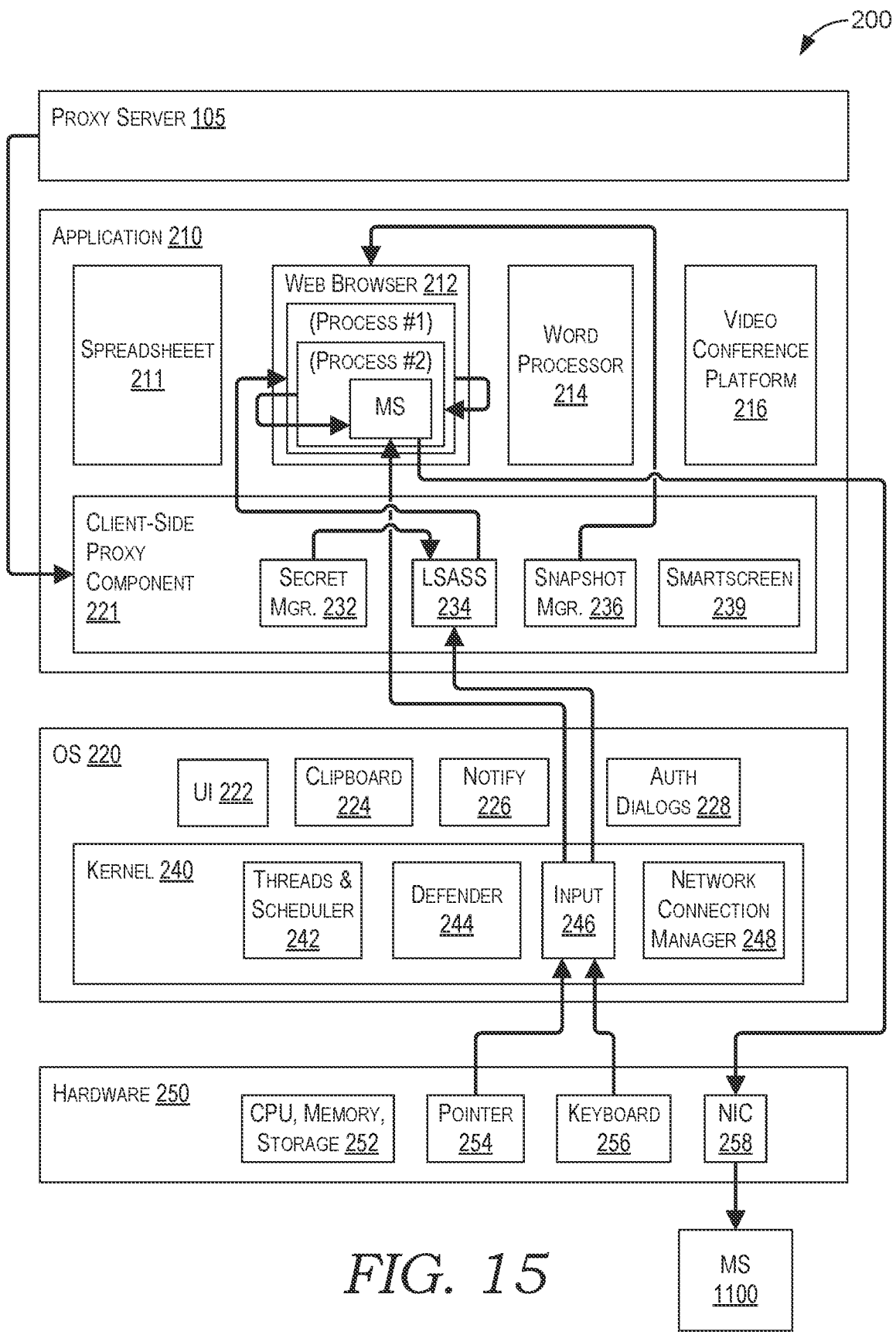
FIG. 15 is a block diagram illustrating activities of components used to confirm correct password use, in accordance with an embodiment of the technology described herein.

Turning now to FIG. 15, the detection of non-threatening password use (for example, copying and pasting the password into a text field) within a MICROSOFT®-related host 1100 is illustrated. Initially, a series of keystrokes or clicks are communicated to the LSASS 234, where the target action is identified in conjunction with other components, such as the SmartScreen component 239. As can be seen, the active application is the web browser application 212 running the client-side proxy component 221. When the target action is detected, a threat assessment is performed. The web browser has two processes running, but in this case, both are connected to legitimate authentication sites. The network context may be determined for both processes. The distributed server system 302 (FIG. 3) may identify that the network address is from a trusted source, or that the network address is the source expected to be used with the password. To verify the identity of the web browser application 212, the snapshot manager 236 could capture a snapshot. If the distributed server system 302 determines the identity of the web browser application 212 to a threshold percent of certainty, the snapshot would not be needed and would be deleted. On the other hand, if the distributed server system 302 determines the identity of the web browser application 212 below a threshold percent of certainty, the snapshot could be requested and then deleted. In this situation, no mitigation needs to be taken, but the snapshot and the application and network context may be gathered to help refine the correct network and application context for use of the password. In one example, this non-threatening snapshot (as well as other captured snapshots) could be labeled for machine learning training purposes.

Example Methods

Figure 16:
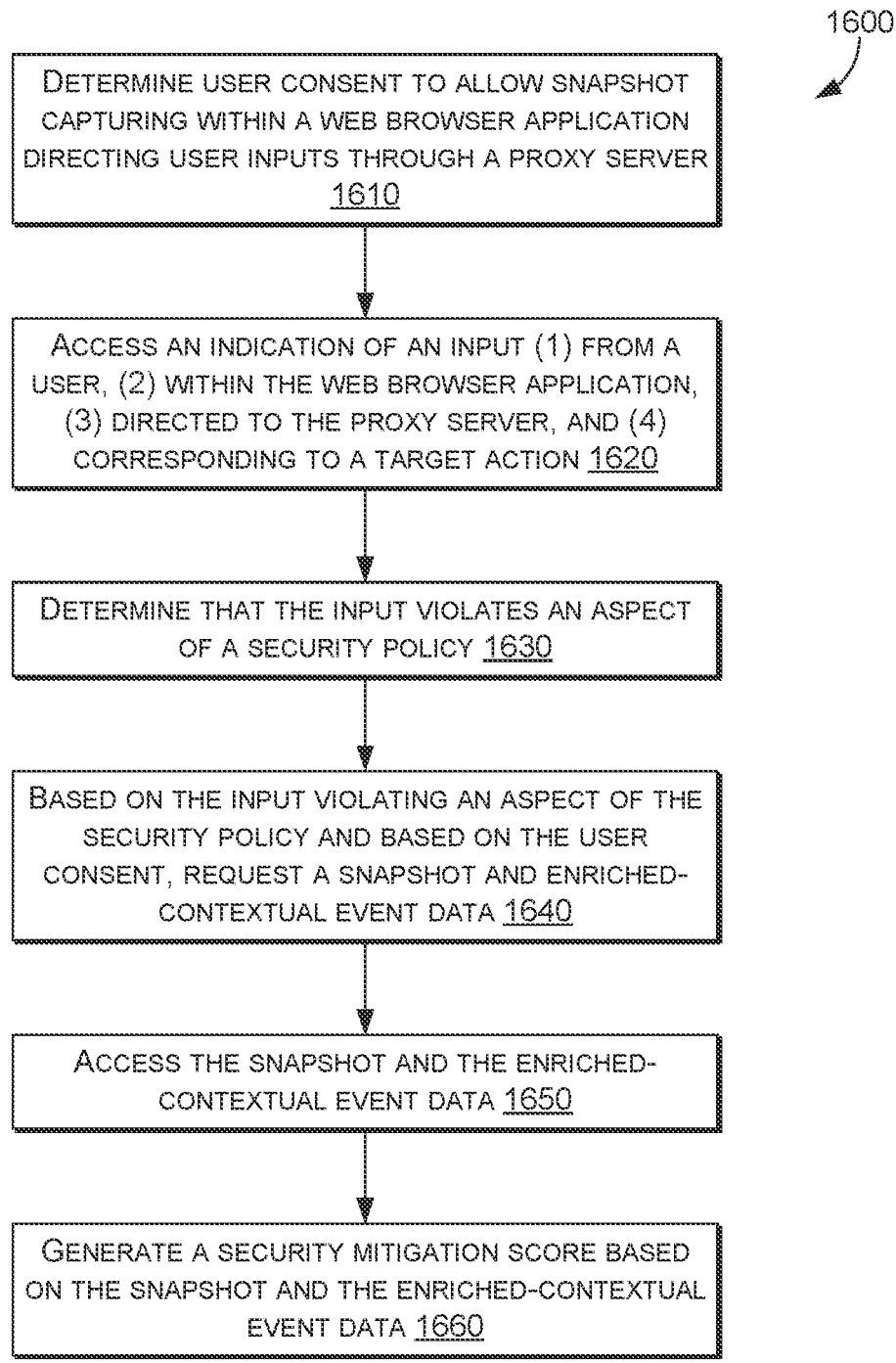
FIG. 16 is a flow diagraph showing a method of accessing a snapshot captured within a web browser component to generate or determine a security mitigation score, in accordance with an embodiment of the technology described herein.
Figure 17:
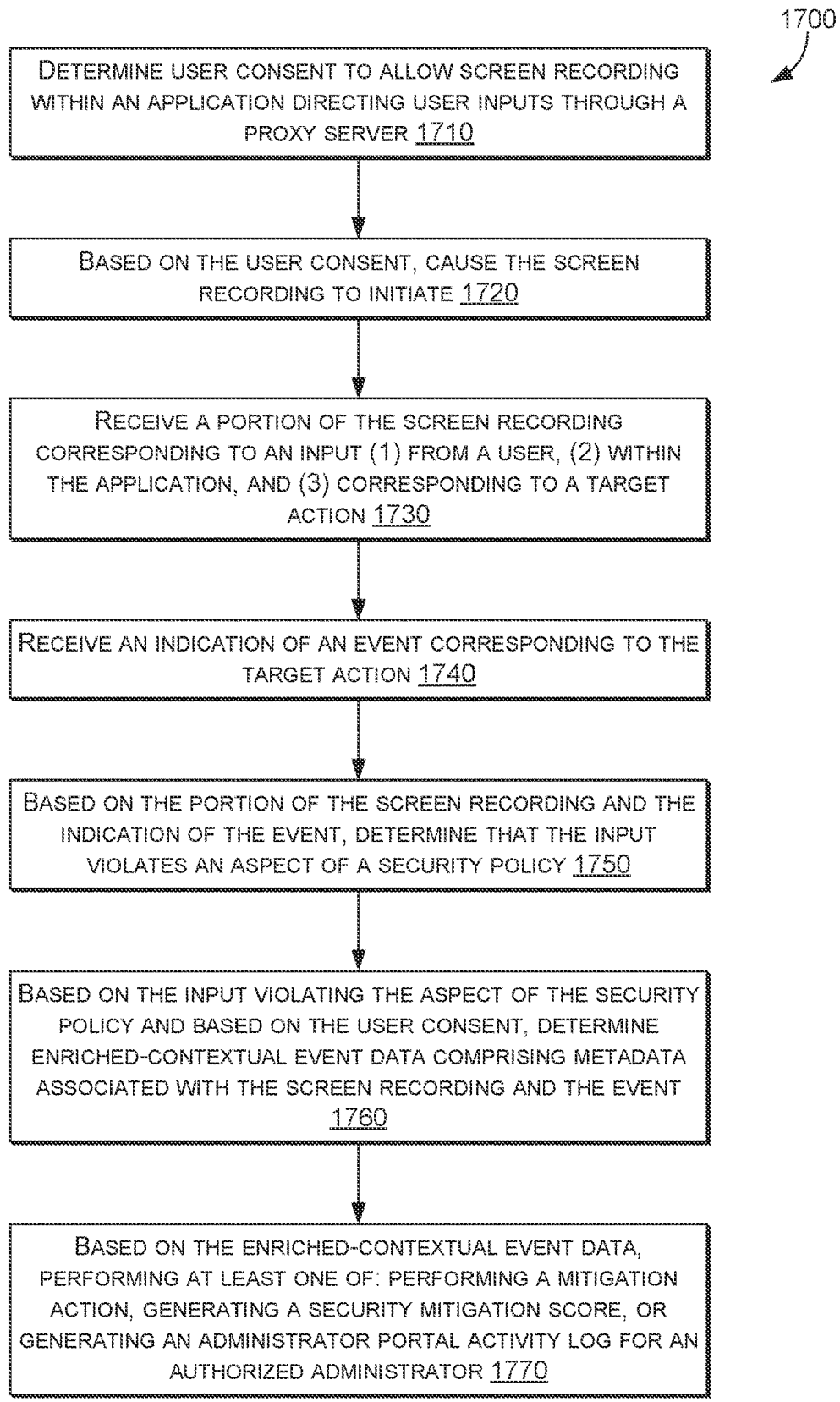
FIG. 17 is a flow diagraph showing a method of performing at least one of: performing a mitigation action, generating a security mitigation score, or generating an administrator portal activity log for an authorized administrator based on snapshot or associated enriched-contextual event data, in accordance with an embodiment of the technology described herein.
Figure 18:
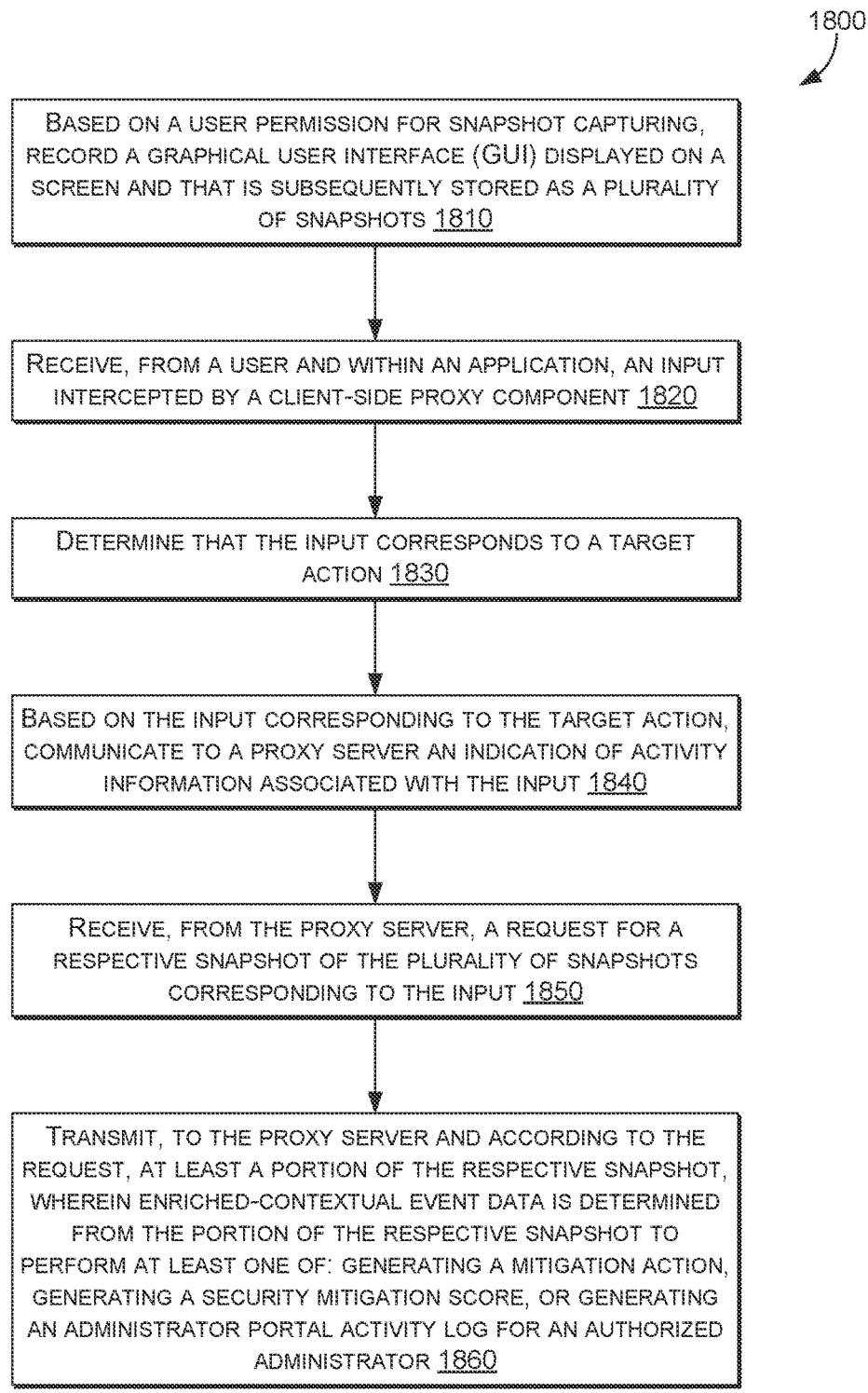
FIG. 18 is a flow diagraph showing a method of transmitting, from a client-side proxy server component and to a proxy server, at least a portion of a respective snapshot to cause performance of at least one of: generating a mitigation action, generating a security mitigation score, or generating an administrator portal activity log for an authorized administrator, in accordance with an embodiment of the technology described herein.

Now referring to FIGS. 16, 17, and 18, each block of methods 1600, 1700, and 1800, described herein, comprises a computing process that may be performed using any combination of hardware, firmware, and/or software. For instance, various functions may be carried out by a processor executing instructions stored in memory. The methods may also be embodied as computer-usable instructions stored on computer-storage media. The method may be provided by an operating system. In addition, methods 1600, 1700, and 1800 are described, by way of example, with respect to FIGS. 1-15. In some embodiments, methods 1600, 1700, and 1800 could be performed on or with systems similar to those described with reference to FIGS. 1-15. For example, methods 1600, 1700, and 1800 are performed by one or more proxy servers 105, distributed server systems 302, or client-side proxy components 221, among other alternative or additional components. These methods may additionally or alternatively be executed by any one system or any combination of systems, including, but not limited to, those described herein.

FIG. 16 is a flow diagram showing a method 1600 for accessing a snapshot captured within a web browser component to generate or determine a security mitigation score, in accordance with some embodiments of the present disclosure. At block 1610, method 1600 includes determining user consent to allow snapshot capturing within a web browser application directing user inputs through a proxy server. At block 1620, method 1600 includes accessing an indication of an input (1) from a user, (2) within the web browser application, (3) directed to the proxy server, and (4) corresponding to a target action. At block 1630, method 1600 includes determining that the input violates an aspect of a security policy. At block 1640, method 1600 includes, based on the input violating an aspect of the security policy and based on the user consent, requesting a snapshot and enriched-contextual event data. At block 1650, method 1600 includes accessing the snapshot and the enriched-contextual event data. At block 1660, method 1600 includes generating a security mitigation score based on the snapshot and the enriched-contextual event data.

FIG. 17 is a flow diagram showing a method 1700 for performing at least one of: performing a mitigation action, generating a security mitigation score, or generating an administrator portal activity log for an authorized administrator based on a snapshot or associated enriched-contextual event data, in accordance with some embodiments of the present disclosure. At block 1710, method 700 includes determining user consent to allow screen recording within an application directing user inputs through a proxy server. At block 1720, method 700 includes, based on the user consent, causing the screen recording to be initiated. At block 1730, method 700 includes receiving a portion of the screen recording corresponding to an input (1) from a user, (2) within the application, and (3) corresponding to a target action. At block 1740, method 700 includes receiving an indication of an event corresponding to the target action. At block 1750, method 700 includes determining, based on the portion of the screen recording and the indication of the event, that the input violates an aspect of a security policy. At block 1760, method 700 includes determining, based on the input violating the aspect of the security policy and based on the user consent, enriched-contextual event data comprising metadata associated with the screen recording and the event. At block 1770, method 700 includes, based on the enriched-contextual event data, performing at least one of: performing a mitigation action, generating a security mitigation score, or generating an administrator portal activity log for an authorized administrator.

FIG. 18 is a flow diagram showing a method 1800 for transmitting, from a client-side proxy server component and to a proxy server, at least a portion of a respective snapshot to cause performance of at least one of: generating a mitigation action, generating a security mitigation score, or generating an administrator portal activity log for an authorized administrator, in accordance with some embodiments of the present disclosure. At block 1810, method 1800 includes, based on a user permission for snapshot capturing, recording a graphical user interface (GUI) displayed on a screen and that is subsequently stored as a plurality of snapshots. At block 1820, method 1800 includes receiving, from a user and within an application, an input intercepted by a client-side proxy component. At block 1830, method 1800 includes determining that the input corresponds to a target action. At block 1840, method 1800 includes, based on the input corresponding to the target action, communicating to a proxy server an indication of activity information associated with the input. At block 1850, method 1800 includes receiving, from the proxy server, a request for a respective snapshot of the plurality of snapshots corresponding to the input. At block 1860, method 1800 includes transmitting, to the proxy server and according to the request, at least a portion of the respective snapshot. Enriched-contextual event data is determined from the portion of the respective snapshot to perform at least one of: generating a mitigation action, generating a security mitigation score, or generating an administrator portal activity log for an authorized administrator.

Exemplary Operating Environment

Figure 19:
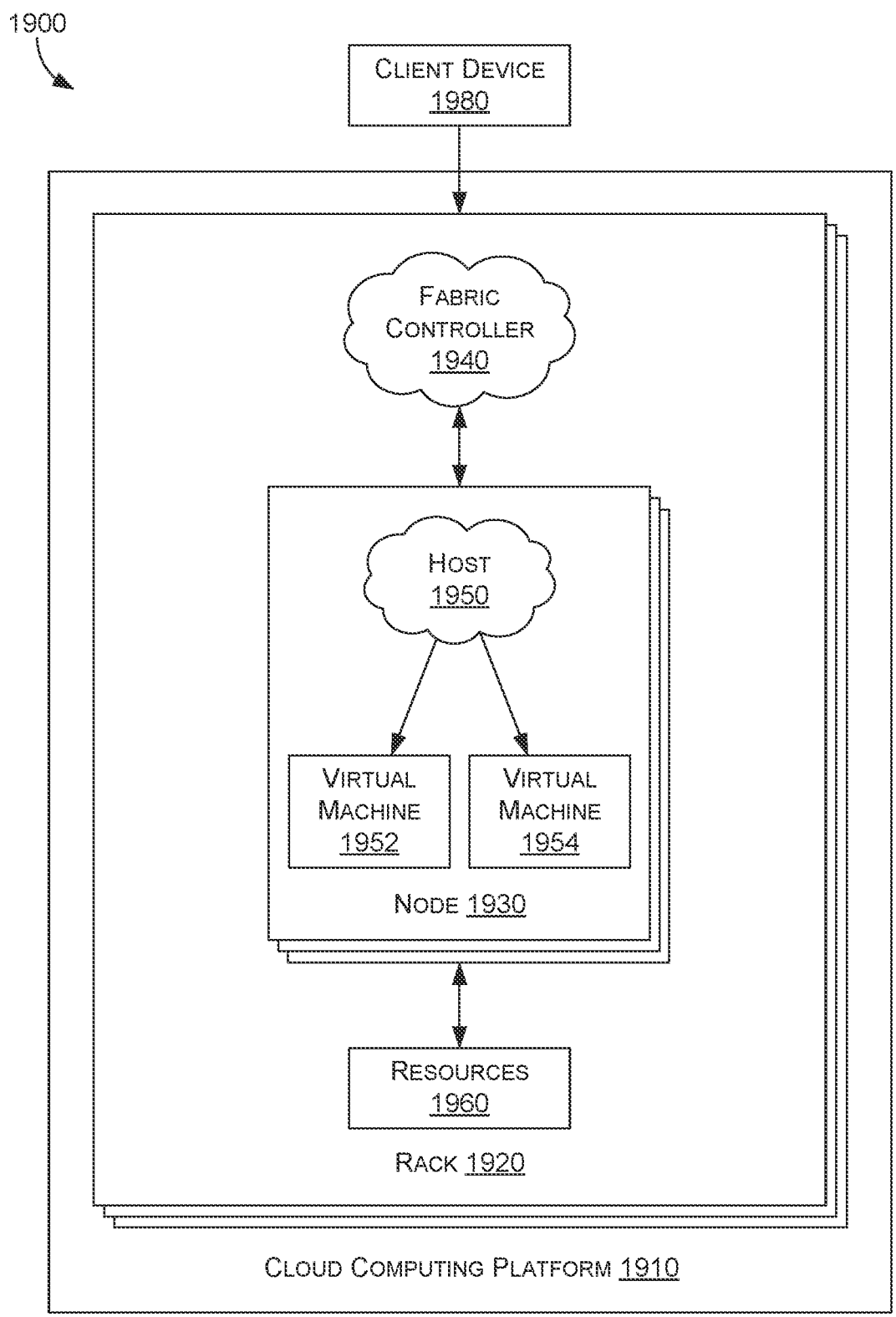
FIG. 19 is a block diagram of an example computing environment suitable for use in implementing aspects of the technology described herein.

Referring now to FIG. 19, FIG. 19 illustrates an example distributed computing environment 1900 in which implementations of the present disclosure can be employed. In one embodiment, the distributed computer environment 1900 corresponds to aspects of the distributed server system 302 (FIG. 3). FIG. 19 shows a high-level architecture of an example cloud computing platform 1910 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1900 that includes cloud computing platform 1910, rack 1920, and node 1930 (for example, computing devices, processing units, or blades) in rack 1920. The technical solution environment can be implemented with cloud computing platform 1910 that runs cloud services across different data centers and geographic regions. Cloud computing platform 1910 can implement fabric controller 1940 component for provisioning and managing resource allocation, deployment, upgrade, and management of cloud services. Typically, cloud computing platform 1910 acts to store data or run service applications in a distributed manner. Cloud computing infrastructure 1910 in a data center can be configured to host and support the operation of end points of a particular service application. Cloud computing infrastructure 1910 may be a public cloud, a private cloud, or a dedicated cloud.

Node 1930 can be provisioned with host 1950 running a defined software stack on node 1930. Node 1930 can also be configured to perform specialized functionality (for example, compute nodes or storage nodes) within cloud computing platform 1910. Node 1930 is allocated to run one or more portions of a service application of a tenant. A tenant can refer to a customer utilizing resources of cloud computing platform 1910. Service application components of cloud computing platform 1910 that support a particular tenant can be referred to as a multi-tenant infrastructure or tenancy. The terms "service application," "application," or "service" are used interchangeably herein and broadly refer to any software or portions of software that run on top of, access storage, and compute device locations within a datacenter.

When more than one separate service application is being supported by nodes 1930, nodes 1930 may be partitioned into virtual machines (for example, virtual machine 1952 and virtual machine 1954). Physical machines can also concurrently run separate service applications. The virtual machines or physical machines can be configured as individualized computing environments that are supported by resources 1960 (for example, hardware resources and software resources) in cloud computing platform 1910. It is contemplated that resources can be configured for specific service applications. Further, each service application may be divided into functional portions such that each functional portion is able to run on a separate virtual machine. In cloud computing platform 1910, multiple servers may be used to run service applications and perform data storage operations in a cluster. In particular, the servers may perform data operations independently but be exposed as a single device, referred to as a cluster. Each server in the cluster can be implemented as a node.

Client device 1980 may be linked to a service application in cloud computing platform 1910. Client device 1980 may be any type of computing device, which may correspond to computing device 2000 described with reference to FIG. 20. For example, client device 1980 is configured to issue commands to cloud computing platform 1910. In embodiments, client device 1980 communicates with service applications through a virtual Internet Protocol (IP) and load balancer, or through other means that direct communication requests to designated end points in cloud computing platform 1910. The components of cloud computing platform 1910 may communicate with each other over a network (not shown), which may include, without limitation, one or more local area networks (LANs) and/or wide area networks (WANs).

Figure 20:
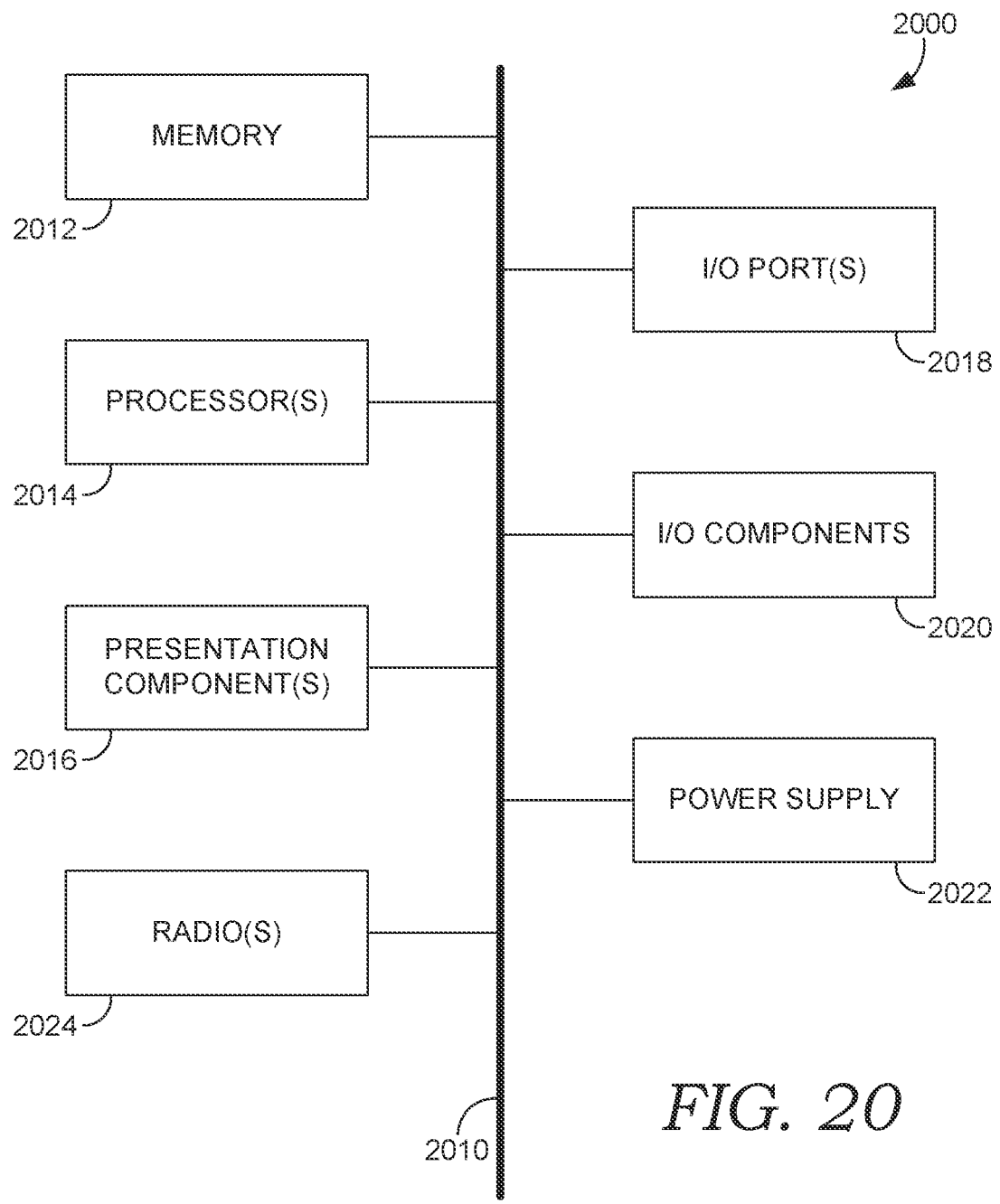
FIG. 20 is a block diagram illustrating a computing device suitable for use with embodiments of the technology described herein.

Referring to the drawings in general, and initially to FIG. 20 in particular, an exemplary operating environment for implementing embodiments of the technology described herein is shown and designated generally as computing device 2000. Computing device 2000 is but one example of a suitable computing environment and is not intended to suggest any limitation as to the scope of use of the technology described herein, and nor should the computing device 2000 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Embodiments of the technology described herein may also be practiced in distributed computing environments where tasks are performed by remote-processing devices that are linked through a communications network.

With continued reference to FIG. 20, computing device 2000 includes a bus 2010 that directly or indirectly couples the following devices: memory 2012, one or more processors 2014, one or more presentation components 2016, input/output (I/O) ports 2018, I/O components 2020, and an illustrative power supply 2022. Bus 2010 represents what may be one or more buses (such as an address bus, data bus, or a combination thereof). Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 20 is merely illustrative of an exemplary computing device that may be used in connection with one or more embodiments of the technology described herein. Distinction is not made between such categories as "workstation," "server," "laptop," "handheld device," etc., as all are contemplated within the scope of FIG. 20 and refer to "computer" or "computing device."

Computing device 2000 typically includes a variety of computer-readable media. Computer-readable media may be any available media that may be accessed by computing device 2000 and includes both volatile and non-volatile, removable and non-removable media. By way of example, and not limitation, computer-readable media may comprise computer-storage media and communication media. Computer-storage media includes both volatile and non-volatile, removable and non-removable media implemented in any method or technology for storage of information such as computer-readable instructions, data structures, program modules, or other data.

Computer-storage media includes RAM (Random-Access Memory), ROM (Read-Only Memory), electronically erasable programmable read-only memory (EEPROM), flash memory or other memory technology, compact disc (CD)-ROM, digital versatile disks (DVDs) or other optical disk storage, magnetic cassettes, magnetic tape, magnetic disk storage, or other magnetic storage devices. Computer-storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer-readable media.

Memory 2012 includes computer-storage media in the form of volatile and/or non-volatile memory. The memory 2012 may be removable, non-removable, or a combination thereof. Exemplary memory includes solid-state memory, hard drives, optical-disc drives, etc. Computing device 2000 includes one or more processors 2014 that read data from various entities such as bus 2010, memory 2012, or I/O components 2020. As used herein, the term processor or "a processer" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 2016 present data indications to a user or other device. Exemplary presentation components 2016 include a display device, speaker, printing component, vibrating component, etc. I/O ports 2018 allow computing device 2000 to be logically coupled to other devices, including I/O components 2020, some of which may be built-in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 2014 may be direct or via a coupling utilizing a serial port, parallel port, and/or other interface and/or system bus known in the art. Furthermore, the digitizer input component may be a component separated from an output component such as a display device, or, in some embodiments, the usable input area of a digitizer may coexist with the display area of a display device, may be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 2000. These requests may be transmitted to the appropriate network element for further processing. An NUI implements any combination of speech recognition, touch and stylus recognition, facial recognition, biometric recognition, gesture recognition (both on screen and adjacent to the screen), air gestures, head and eye tracking, and touch recognition associated with displays on the computing device 2000. The computing device 2000 may be equipped with depth cameras, such as stereoscopic camera systems, infrared camera systems, red-green-blue (RGB) camera systems, and combinations of these, for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

A computing device may include a radio 2024. The radio 2024 transmits and receives radio communications. The computing device may be a wireless terminal adapted to receive communications and media over various wireless networks. Computing device 2000 may communicate via wireless policies, such as code-division multiple access ("CDMA"), global system for mobiles ("GSM"), or time-division multiple access ("TDMA"), as well as others, to communicate with other devices. The radio communications may be a short-range connection, a long-range connection, or a combination of both a short-range and a long-range wireless telecommunications connection. When referring to "short" and "long" types of connections, it should be understood that reference may not intend on referring to the spatial relation between two devices. Instead, such terms may generally refer to short range and long range as different categories, or types, of connections (i.e., a primary connection and a secondary connection). A short-range connection may include a Wi-Fi® connection to a device (for example, mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, General Packet Radio Service (GPRS), GSM, TDMA, and 802.16 policies.

Embodiments

In some embodiments, one or more computer-storage media are provided. The one or more computer-storage media comprise computer-executable instructions that when executed by a computing device cause the computing device to determine user consent to allow snapshot capturing within a web browser application directing user inputs through a proxy server; access, from a user and within the web browser application, an indication of an input directed to the proxy server and corresponding to a target action; determine that the input violates an aspect of a security policy; based on the input violating an aspect of the security policy and based on the user consent, request a snapshot and enriched-contextual event data; access the snapshot and the enriched-contextual event data; and based on the snapshot and the enriched-contextual event data, generate a security mitigation score corresponding to a mitigation action.

Advantageously, technical effects of these and other embodiments, as described herein, employ a snapshot to receive and use additional details relevant to the classification or mitigation of the threat, thereby enhancing the context of a candidate threat. Moreover, to reduce latency, preserve computation resources, and avoid overloading a network bandwidth, embodiments of the technology described herein request the captured snapshot in certain instances, for example, after user consent or based on a violation of an aspect of the security policy. In this manner, network bandwidth is conserved by not automatically communicating every snapshot. Locally, in some embodiments, the snapshot is deleted after a period of time or after a corresponding threat assessment has been completed. In this manner, a cache can be cleared or storage space updated to allow for storage of other data, thereby reducing memory strains that would otherwise be caused by storing and not deleting the snapshots. These benefits can be achieved while leveraging the proxy server's functionality, including maintaining the user's anonymity, filtering content, performing caching operations to reduce bandwidth usage, providing access control functionality, and enhancing network security, among others.

In any combination of the above embodiments of the one or more computer-storage media, determining that the input violates the aspect of the security policy comprises: receiving the indication of the input, an identification (ID) for the user, and an event ID corresponding to the target action; based on the indication of the input, the ID for the user, and the event ID, determining a present context for the web browser application; and detecting a mismatch between the present context and an expected context for the web browser application, the mismatch corresponding to the violation of the aspect of the security policy.

In any combination of the above embodiments of the one or more computer-storage media, the computer-executable instructions further cause the computing device to initiate a security mitigation based on the security mitigation score. In this example, the security mitigation is determined based on a snapshot phishing machine learning model trained on a plurality of snapshot features, and the security mitigation initiated based on the snapshot and a classification of a threat determined by the snapshot phishing machine learning model.

In any combination of the above embodiments of the one or more computer-storage media, the computer-executable instructions further cause the computing device to: generate an event record having an event ID and one or more entries corresponding to the snapshot and the enriched-contextual event data; and store the event record in a database managed by a distributed server system, wherein the database is accessible to an administrator. In this example, the event record is ordered based on a first-in first-out (FIFO) scheme or based on the security mitigation score.

In any combination of the above embodiments of the one or more computer-storage media, the computer-executable instructions further cause the computing device to update the security policy based on the event record.

In any combination of the above embodiments of the one or more computer-storage media, the target action comprises at least one of: a print action; a clipboard action comprising at least one of a copy action, a cut action, and a paste action; or a file action comprising at least one of a download action or an upload action.

In any combination of the above embodiments of the one or more computer-storage media, the snapshot comprises a recording of a portion of an entire graphical user interface presented to the user during a time period during which the input is received.

In any combination of the above embodiments of the one or more computer-storage media, the input corresponds to inputting credentials. In one embodiment, determining that the input corresponds to the credential comprises: intercepting the input; generating a hash of the input; and comparing the hash of the input with a credential hash of the credential.

In any combination of the above embodiments of the one or more computer-storage media, the enriched-contextual event data comprises metadata associated with the snapshot and the target action, wherein the metadata is not included in the indication of the input.

In any combination of the above embodiments of the one or more computer-storage media, generating the security mitigation score comprises: performing optical character recognition (OCR) analysis on the snapshot; extracting one or more text features from the snapshot based on the OCR analysis; and based on the one or more text features and based on the enriched-contextual event data, determining the security mitigation score indicative of a severity level of the input violating the aspect of the security policy.

In some embodiments, a distributed server system is provided, employing any components of the computerized (or computer, computing, or cloud) system described in any of the embodiments above. The distributed server system comprises at least one computer processor, and computer memory having computer-readable instructions embodied thereon, that, when executed by the at least one computer processor, perform operations. The operations comprise causing screen recording to initiate within an application configured to receive user inputs; receiving a portion of the screen recording corresponding to an input from a user, within the application, and corresponding to a target action; receiving an indication of an event corresponding to the target action; based on the portion of the screen recording and the indication of the event, determining that the input violates an aspect of a security policy; based on the input violating the aspect of the security policy, determining enriched-contextual event data comprising metadata associated with the screen recording and the event; and based on the enriched-contextual event data, performing at least one of: performing a mitigation action, generating a security mitigation score, or generating an administrator portal activity log for an authorized administrator.

Advantageously, technical effects of these and other embodiments, as described herein, employ a snapshot to receive and use additional details relevant to the classification or mitigation of the threat, thereby enhancing the context of a candidate threat. Moreover, to reduce latency, preserve computation resources, and avoid overloading a network bandwidth, embodiments of the technology described herein request the captured snapshot in certain instances, for example, after user consent or based on a violation of an aspect of the security policy. In this manner, network bandwidth is conserved by not automatically communicating every snapshot. Locally, in some embodiments, the snapshot is deleted after a period of time or after a corresponding threat assessment has been completed. In this manner, a cache can be cleared or storage space updated to allow for storage of other data, thereby reducing memory strains that would otherwise be caused by storing and not deleting the snapshots. These benefits can be achieved while leveraging the proxy server's functionality, including maintaining the user's anonymity, filtering content, performing caching operations to reduce bandwidth usage, providing access control functionality, and enhancing network security, among others.

In any combination of the above embodiments of the distributed server system, determining that the input violates the aspect of the security policy comprises: receiving the portion of the screen recording, an identification (ID) for the user, and an event ID corresponding to the target action; based on the portion of the screen recording, the ID for the user, and the event ID, determining a present context for the application; and detecting a mismatch between the present context and an expected context for the application, the mismatch corresponding to the violation of the aspect of the security policy.

In any combination of the above embodiments of the distributed server system, detecting the mismatch is based on at least one of: a comparison of a present URL and an expected URL, a comparison of a present IP address and an expected IP address, a comparison of a present process ID and an expected process ID, a comparison of a present Server Name Indication (SNI) and an expected SNI, or a comparison of a present domain information and an expected domain information.

In any combination of the above embodiments of the distributed server system, the operations further comprise: generating an event record having an event ID and one or more entries corresponding to the screen recording and the enriched-contextual event data; and publishing the event record to the administrator portal activity log accessible within the distributed server system to an administrator. In one embodiment, the administrator portal activity log is ordered based on a first-in first-out (FIFO) scheme or based on the security mitigation score.

In any combination of the above embodiments of the distributed server system, the application comprises a web browser application, a video conference platform application, or a productivity application.

In any combination of the above embodiments of the distributed server system, the target action comprising at least one of: a print action; a clipboard action comprising at least one of a copy action, a cut action, and a paste action; or a file action comprising at least one of a download action or an upload action.

In some embodiments, a computer-implemented method is provided and is implemented using any of the embodiments described herein. The computer-implemented method includes based on a user permission for snapshot capturing, recording a graphical user interface (GUI) displayed on a screen and that is subsequently stored as a plurality of snapshots; receiving, from a user and within an application, an input intercepted by a client-side proxy component; determining that the input corresponds to a target action; based on the input corresponding to the target action, communicating to a proxy server an indication indicative of activity information associated with the input; receiving, from the proxy server, a request for a respective snapshot of the plurality of snapshots corresponding to the input; and transmitting, to the proxy server and according to the request, at least a portion of the respective snapshot, wherein enriched-contextual event data is determined from the portion of the respective snapshot to perform at least one of: generating a mitigation action, generating a security mitigation score, or generating an administrator portal activity log for an authorized administrator.

Advantageously, technical effects of these and other embodiments, as described herein, employ a snapshot to receive and use additional details relevant to the classification or mitigation of the threat, thereby enhancing the context of a candidate threat. Moreover, to reduce latency, preserve computation resources, and avoid overloading a network bandwidth, embodiments of the technology described herein request the captured snapshot in certain instances, for example, after user consent or based on a violation of an aspect of the security policy. In this manner, network bandwidth is conserved by not automatically communicating every snapshot. Locally, in some embodiments, the snapshot is deleted after a period of time or after a corresponding threat assessment has been completed. In this manner, a cache can be cleared or storage space updated to allow for storage of other data, thereby reducing memory strains that would otherwise be caused by storing and not deleting the snapshots. These benefits can be achieved while leveraging the proxy server's functionality, including maintaining the user's anonymity, filtering content, performing caching operations to reduce bandwidth usage, providing access control functionality, and enhancing network security, among others.

In any combination of the above embodiments of the computer-implemented method, the application comprises a web browser application.

In any combination of the above embodiments of the computer-implemented method, further comprising: receiving an indication of the user permission; and based on the user permission, establishing a connection with a screen capture application programming interface (API), wherein the GUI is recorded based on the screen capture API.

In any combination of the above embodiments of the computer-implemented method, the target action comprises at least one of: a print action; a clipboard action comprising at least one of a copy action, a cut action, and a paste action; or a file action comprising at least one of a download action or an upload action.

The technology described herein has been described in relation to particular embodiments, which are intended in all respects to be illustrative rather than restrictive. While the technology described herein is susceptible to various modifications and alternative constructions, certain illustrated embodiments thereof are shown in the drawings and have been described above in detail. It should be understood, however, that there is no intention to limit the technology described herein to the specific forms disclosed. On the contrary, the intention is to cover all modifications, alternative constructions, and equivalents falling within the spirit and scope of the technology described herein.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described herein. For instance, various functions may be carried out by a processor executing instructions stored in memory. As such, other arrangements and elements (for example, machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving" or "transmitting," as facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present disclosure generally refer to the technical solution environment and the schematics described herein, it is understood that the techniques described may be extended to other implementation contexts.

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope. Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

From the foregoing, it will be seen that this disclosure is one well-adapted to attain all the ends and objects hereinabove set forth together with other advantages which are obvious and which are inherent to the structure.

It will be understood that certain features and subcombinations are of utility and may be employed without reference to other features or subcombinations. This is contemplated by and is within the scope of the claims.

What is claimed is:

1. One or more computer-storage media comprising computer-executable instructions that when executed by a computing device cause the computing device to:
   determine user consent to allow snapshot capturing within a web browser application directing user inputs through a proxy server;
   access, from a user and within the web browser application, an indication of an input directed to the proxy server and corresponding to a target action;
   determine that the input violates an aspect of a security policy;
   based on the input violating an aspect of the security policy and based on the user consent, request a snapshot and enriched-contextual event data, wherein the snapshot comprises a recording of a portion of an entire graphical user interface presented during a time period when the input is received;
access the snapshot and the enriched-contextual event data; and
based on the snapshot and the enriched-contextual event data, generate a security mitigation score corresponding to a mitigation action comprising one or more of: omitting sensitive or confidential information, reporting a threat, sending the snapshot to a target account, blocking credential inputs, requesting a password change, or disabling a password.

2. The computer-storage media of claim 1, wherein determining that the input violates the aspect of the security policy comprises:
receiving the indication of the input, a user identification (ID) for the user, and an event ID corresponding to the target action;
based on the indication of the input, the user ID for the user, and the event ID, determining a present context for the web browser application; and
detecting a mismatch between the present context and an expected context for the web browser application, the mismatch corresponding to the violation of the aspect of the security policy.

3. The computer-storage media of claim 1, wherein the computer-executable instructions further cause the computing device to initiate a security mitigation based on the security mitigation score, wherein the security mitigation is determined based on a snapshot phishing machine learning model trained on a plurality of snapshot features, the security mitigation initiated based on the snapshot and a classification of a threat determined by the snapshot phishing machine learning model.

4. The computer-storage media of claim 1, wherein the computer-executable instructions further cause the computing device to:
generate an event record having an event ID and one or more entries corresponding to the snapshot and the enriched-contextual event data; and
store the event record in a database managed by a distributed server system, wherein the database is accessible to an administrator, wherein the event record is ordered based on a first-in first-out (FIFO) scheme or based on the security mitigation score.

5. The computer-storage media of claim 4, wherein the computer-executable instructions further cause the computing device to update the security policy based on the event record.

6. The computer-storage media of claim 1, wherein the target action comprises at least one of:
a print action;
a clipboard action comprising at least one of a copy action, a cut action, and a paste action; or
a file action comprising at least one of a download action or an upload action.

7. The computer-storage media of claim 1, wherein the computer-executable instructions further cause the computing device to determine that the input corresponds to inputting credentials, wherein determining that the input corresponds to inputting credentials comprises:
intercepting the input;
generating a hash of the input; and
comparing the hash of the input with a credential hash of the credentials.

8. The computer-storage media of claim 1, wherein the enriched-contextual event data comprises metadata associated with the snapshot and the target action, wherein the metadata is not included in the indication of the input.

9. The computer-storage media of claim 1, wherein generating the security mitigation score comprises:
performing optical character recognition (OCR) analysis on the snapshot;
extracting one or more text features from the snapshot based on the OCR analysis; and
based on the one or more text features and based on the enriched- contextual event data, determining the security mitigation score indicative of a severity level of the input violating the aspect of the security policy.

10. A distributed server system, comprising:
at least one computer processor; and
computer memory storing computer-usable instructions that, when used by the at least one computer processor, cause the distributed server system to perform operations comprising:
causing screen recording to initiate within an application configured to receive user inputs;
receiving a portion of the screen recording corresponding to an input from a user, within the application, and corresponding to a target action, wherein the portion of the screen recording comprises a portion of an entire graphical user interface associated with the application presented during a time period when the input is received;
receiving an indication of an event corresponding to the target action;
based on the portion of the screen recording and the indication of the event, determining that the input violates an aspect of a security policy;
based on the input violating the aspect of the security policy, determining enriched-contextual event data comprising metadata associated with the screen recording and the event; and
based on the enriched-contextual event data, performing at least one of: performing a mitigation action, generating a security mitigation score, or generating an administrator portal activity log for an authorized administrator, wherein the mitigation action comprises one or more of:
omitting sensitive or confidential information, reporting a threat, sending the snapshot to a target account, blocking credential inputs, requesting a password change, or disabling a password.

11. The distributed server system of claim 10, wherein determining that the input violates the aspect of the security policy comprises:
receiving the portion of the screen recording, a user identification (ID) for the user, and an event ID corresponding to the target action;
based on the portion of the screen recording, the user ID for the user, and the event ID, determining a present context for the application; and
detecting a mismatch between the present context and an expected context for the application, the mismatch corresponding to the violation of the aspect of the security policy.

12. The distributed server system of claim 11, wherein detecting the mismatch is based on at least one of: a comparison of a present URL and an expected URL, a comparison of a present IP address and an expected IP address, a comparison of a present process ID and an expected process ID, a comparison of a present Server Name Indication (SNI) and an expected SNI, or a comparison of a present domain information and an expected domain information.

13. The distributed server system of claim 10, wherein the operations further comprise:
    generating an event record having an event ID and one or more entries corresponding to the screen recording and the enriched-contextual event data; and
    publishing the event record to the administrator portal activity log accessible within the distributed server system to an administrator, wherein the administrator portal activity log is ordered based on a first-in first-out (FIFO) scheme or based on the security mitigation score.

14. The distributed server system of claim 10, wherein the application comprises a web browser application, a video conference platform application, or a productivity application.

15. The distributed server system of claim 10, the target action comprising at least one of:
    a print action;
    a clipboard action comprising at least one of a copy action, a cut action, and a paste action; or
    a file action comprising at least one of a download action or an upload action.

16. A computer-implemented method, comprising:
    based on a user permission for snapshot capturing, recording a graphical user interface (GUI) displayed on a screen and that is subsequently stored as a plurality of snapshots;
    receiving, from a user and within an application, an input intercepted by a client-side proxy component;
    determining that the input corresponds to a target action;
    based on the input corresponding to the target action, communicating to a proxy server an indication indicative of activity information associated with the input;
    receiving, from the proxy server, a request for a respective snapshot of the plurality of snapshots, wherein the respective snapshot comprises a recording of a portion of the GUI during a time period corresponding to when the input is received; and
    transmitting, to the proxy server and according to the request, at least a portion of the respective snapshot, wherein enriched-contextual event data is determined from the portion of the respective snapshot to perform at least one of: generating a mitigation action, generating a security mitigation score, or generating an administrator portal activity log for an authorized administrator, wherein the mitigation action comprises one or more of: omitting sensitive or confidential information, reporting a threat, sending the snapshot to a target account, blocking credential inputs, requesting a password change, or disabling a password.

17. The computer-implemented method of claim 16, wherein the application comprises a web browser application.

18. The computer-implemented method of claim 16, further comprising:
    receiving an indication of the user permission; and
    based on the user permission, establishing a connection with a screen capture application programming interface (API), wherein the GUI is recorded based on the screen capture API.

19. The computer-implemented method of claim 16, wherein the target action comprises at least one of:
    a print action;
    a clipboard action comprising at least one of a copy action, a cut action, and a paste action; or
    a file action comprising at least one of a download action or an upload action.

\* \* \* \* \*